(12) United States Patent
Bolton

(10) Patent No.: US 12,214,521 B2
(45) Date of Patent: *Feb. 4, 2025

(54) METHOD AND SYSTEM FOR LAYERED WOOD PRODUCT PRODUCTION

(71) Applicant: Boise Cascade Company, Boise, ID (US)

(72) Inventor: David Bolton, Lena, LA (US)

(73) Assignee: Boise Cascade Company, Boise, ID (US)

( * ) Notice: Subject to any disclaimer, the term of this patent is extended or adjusted under 35 U.S.C. 154(b) by 675 days.

This patent is subject to a terminal disclaimer.

(21) Appl. No.: 17/100,498

(22) Filed: Nov. 20, 2020

(65) Prior Publication Data

US 2022/0161454 A1  May 26, 2022

(51) Int. Cl.
| | |
|---|---|
| *B27D 1/06* | (2006.01) |
| *B25J 9/16* | (2006.01) |
| *B27D 3/00* | (2006.01) |
| *B27G 11/00* | (2006.01) |

(52) U.S. Cl.
CPC ............... *B27D 1/06* (2013.01); *B27D 3/00* (2013.01); *B27G 11/00* (2013.01); *B25J 9/1682* (2013.01); *B25J 9/1687* (2013.01)

(58) Field of Classification Search
CPC ... B27D 1/06; B27D 3/00; B27D 1/04; B27G 11/00; B27G 11/005; B25J 9/1687; B25J 9/1682
See application file for complete search history.

(56) References Cited

U.S. PATENT DOCUMENTS

| | | |
|---|---|---|
| 3,566,937 A | 3/1971 | Erickson |
| 3,606,942 A | 9/1971 | Daniels |
| 4,421,983 A | 12/1983 | Fogle et al. |
| 4,614,555 A | 9/1986 | Smith et al. |
| 4,630,424 A | 12/1986 | Eberle et al. |

(Continued)

FOREIGN PATENT DOCUMENTS

| | | | |
|---|---|---|---|
| CA | 2907295 | 4/2016 | |
| CN | 108362702 A | * 8/2018 | ............. G01B 11/06 |

(Continued)

OTHER PUBLICATIONS

Translation of CN-108362702-A, Aug. 2018, Ding L (Year: 2018).*

(Continued)

*Primary Examiner* — George R Koch
(74) *Attorney, Agent, or Firm* — Hawley Troxell; Philip McKay; Rivkah Young

(57) ABSTRACT

A method and system for production of layered wood products employs local and independently operating robotic panel assembly cells including one or more veneer handling robots, one or more core handling robots, and one or more glue application robots to produce stacks of layered wood product panels locally near the pressing stations. Consequently, the stacks of layered wood product panels are independently built at, or near, the location of the pressing stations. This eliminates the need for traditional panel conveyors, traditional layered wood product panel assembly layup lines, and stack press delivery lines. This, in turn, eliminates thousands of moving parts and dozens of people from the layered wood product production process.

19 Claims, 16 Drawing Sheets

(56) References Cited

U.S. PATENT DOCUMENTS

| | | |
|---|---|---|
| 4,641,480 A | 2/1987 | Mort |
| 4,797,169 A | 1/1989 | Aizawa et al. |
| 4,872,299 A | 10/1989 | Troutner |
| 4,879,752 A | 11/1989 | Aune et al. |
| 4,893,961 A | 1/1990 | O'Sullivan et al. |
| 4,942,084 A | 7/1990 | Prince |
| 4,967,534 A | 11/1990 | Lines |
| 5,892,808 A | 4/1999 | Goulding et al. |
| 5,960,104 A | 9/1999 | Conners et al. |
| 6,495,833 B1 | 12/2002 | Alfano et al. |
| 6,525,319 B2 | 2/2003 | Meglen et al. |
| 6,543,604 B1 * | 4/2003 | Pung ............ B65G 57/04 |
| | | 198/468.4 |
| 9,164,029 B2 | 10/2015 | Tsuchikawa et al. |
| 10,260,232 B1 | 4/2019 | Conboy |
| 10,580,126 B1 | 3/2020 | Weinschenk |
| 10,825,164 B1 | 11/2020 | Bolton et al. |
| 10,933,556 B2 | 3/2021 | Bolton et al. |
| 10,933,557 B2 | 3/2021 | Bolton et al. |
| 11,090,833 B2 | 8/2021 | Bolton et al. |
| 11,200,663 B1 | 12/2021 | Bolton et al. |
| 11,222,419 B1 | 1/2022 | Bolton et al. |
| 11,453,211 B2 * | 9/2022 | Bolton ............ B32B 7/12 |
| 2002/0057838 A1 | 5/2002 | Steger |
| 2002/0113212 A1 | 8/2002 | Meglen et al. |
| 2003/0030002 A1 | 2/2003 | Safai |
| 2003/0042180 A1 | 3/2003 | Kairi |
| 2004/0146615 A1 | 7/2004 | McDonald et al. |
| 2004/0206676 A1 | 10/2004 | Dai et al. |
| 2005/0098728 A1 | 5/2005 | Alfano et al. |
| 2005/0147286 A1 | 7/2005 | Lee et al. |
| 2005/0161118 A1 | 7/2005 | Carman et al. |
| 2005/0202226 A1 | 9/2005 | Alfonso |
| 2007/0102108 A1 | 5/2007 | Zheng et al. |
| 2007/0131862 A1 | 6/2007 | Cowan et al. |
| 2007/0137323 A1 | 6/2007 | Stanley et al. |
| 2007/0143066 A1 | 6/2007 | Stanley et al. |
| 2007/0143075 A1 | 6/2007 | Stanley et al. |
| 2007/0222100 A1 | 9/2007 | Husted et al. |
| 2007/0246125 A1 | 10/2007 | Latos |
| 2008/0243424 A1 | 10/2008 | Jones et al. |
| 2009/0279773 A1 | 11/2009 | Gan et al. |
| 2010/0141754 A1 | 6/2010 | Hiraoka |
| 2011/0200231 A1 | 8/2011 | Vedova et al. |
| 2012/0301601 A1 | 11/2012 | Jewell et al. |
| 2013/0333805 A1 | 12/2013 | Gagnon et al. |
| 2014/0046471 A1 * | 2/2014 | Bamford ............ G05B 19/048 |
| | | 901/44 |
| 2014/0202345 A1 | 7/2014 | Wood |
| 2014/0238546 A1 | 8/2014 | Barker |
| 2016/0040933 A1 | 2/2016 | Stanish |
| 2016/0067879 A1 | 3/2016 | Capps |
| 2016/0103115 A1 | 4/2016 | Hamby |
| 2016/0123871 A1 | 5/2016 | Kalwa et al. |
| 2016/0274022 A1 | 9/2016 | Gagne |
| 2017/0018071 A1 | 1/2017 | Voyer et al. |
| 2017/0023489 A1 | 1/2017 | Iizuka et al. |
| 2017/0050334 A1 | 2/2017 | Aylsworth |
| 2017/0074805 A1 | 3/2017 | Paul et al. |
| 2018/0059014 A1 | 3/2018 | Ruback et al. |
| 2019/0168413 A1 | 6/2019 | Conboy |
| 2020/0171695 A1 | 6/2020 | Bolton et al. |
| 2020/0171696 A1 | 6/2020 | Bolton et al. |
| 2020/0171697 A1 | 6/2020 | Bolton et al. |
| 2020/0173914 A1 | 6/2020 | Bolton et al. |
| 2020/0173915 A1 | 6/2020 | Bolton et al. |
| 2020/0175670 A1 | 6/2020 | Bolton et al. |
| 2020/0234427 A1 | 7/2020 | Cui et al. |
| 2020/0254615 A1 | 8/2020 | Bryner et al. |
| 2020/0269439 A1 | 8/2020 | Telleria et al. |
| 2021/0319548 A1 | 10/2021 | Bolton et al. |
| 2021/0327049 A1 | 10/2021 | Bolton et al. |
| 2021/0362483 A1 | 11/2021 | Hass et al. |
| 2021/0398269 A1 | 12/2021 | Bolton et al. |
| 2021/0398270 A1 | 12/2021 | Bolton et al. |
| 2022/0236176 A1 | 7/2022 | Bolton et al. |

FOREIGN PATENT DOCUMENTS

| | | |
|---|---|---|
| CN | 110948613 | 4/2020 |
| DE | 102019125608 A1 * | 3/2021 |
| EP | 2631644 | 12/2014 |
| JP | 2014205306 | 10/2014 |
| JP | 2014205338 | 10/2014 |
| JP | 2014215233 | 11/2014 |
| JP | 2019-166657 | 10/2019 |
| KR | 10-2019-0070756 | 6/2019 |
| WO | WO 2016-201553 | 12/2016 |
| WO | WO-2018178846 A1 * | 10/2018 |
| WO | WO 2020-153848 | 7/2020 |

OTHER PUBLICATIONS

Translation of WO-2018178846-A1, Oct. 2018, Bolzoni L (Year: 2018).*

Translation of DE-102019125608-A1, Mar. 2021, Rister R (Year: 2021).*

V. O. Tormanen and A. J. Makynen, "Determination of wood moisture content using angularly, spatially and spectrally resolved reflectance," 2011 IEEE International Instrumentation and Measurement Technology Conference, 2011, pp. 1-5, doi: 10.1109/IMTC.2011.5944140. (Year: 2011).

Conners et al., "Machine vision technology for the forest products industry," 1997, IEEE, Computer, vol. 30. No. 7, pp. 43-48. (Year: 1997).

Nieminen et al., "Laser transillumination imaging for determining wood defects and grain angle," 2013, Measurement Science and Technology, vol. 24, No. 125401, 7 pages. (Year 2013).

Tsuchikawa et al., "A review of recent application of near infrared spectroscopy to wood science and technology," 2015, Journal of Wood Science, vol. 61, pp. 213-220. (Year: 2015).

Colares et al., "Near infrared hyperspectral imaging and MCR-ALS applied for mapping chemical composition of the wood specie Swietenia Macrophylla King (Mahogany) at microscopic level," 2016, Microchemical Journal, vol. 124, pp. 356-363. (Year: 2016).

Cognex Vision Software, "GigE Vision Cameras User's Guide," Published 2011.

Cognex, "Vision Controller Installation Manual," 2014.

Cognex, "Vision Product Guide," 2018.

USNR Transverse High Grader information sheet, copyright 2019; retrieved May 23, 2019 from https://www.usnr.com/en/product/THGLM.

USNR Lineal High Grader information sheet, copyright 2019; retrieved May 23, 2019 from https://www.usnr.com/en/product/LHGLM.

USNR LHG E-Valuator Module, copyright 2019; retrieved May 23, 2019 from https://www.usnr.com/en/product/LHGEValuatorLM.

USNR Planer/Dry Mill Optimization information sheet, copyright 2019; retrieved May 23, 2019 from https://www.usnr.com/en/product/mktoptplanermilllm.

Mecano Advantages information sheet, copyright 2019; retrieved May 23, 2019 from http://www.raute.com/mecano-advantages.

Mecano Solutions information sheet, copyright 2019; retrieved May 23, 2019 from http://www.raute.com/mecano-solutions.

Mecano Products information sheet, copyright 2019; retrieved May 23, 2019 from http://www.raute.com/264.

Drying Lines information sheets, copyright 2019; retrieved May 23, 2019 from http://www.raute.com/mecano-drying-lines?redirect=http%3A%2F%2Fwww.raute.com%2Flvl%3Fp_p_id%3D%26p_plifecycle%3D0%26p_p_state% . . . .

Layup Lines information sheet, copyright 2019; retrieved May 23, 2019 from http://www.raute.com/mecano-layup-lines.

Veneer Handling Lines information sheet, copyright 2019; retrieved May 23, 2019 from http://www.raute.com/mecano-veneer-handling-lines.

(56) References Cited

OTHER PUBLICATIONS

Panel Handling Lines information sheet, copyright 2019; retrieved May 23, 2019 from http://www.raute.com/mecano-panel-handling-lines.
Peeling Lines information sheet, copyright 2019; retrieved May 23, 2019 from http://www.raute.com/268.
Smart Mill Concept information sheet, copyright 2019; retrieved May 23, 2019 from http://www.raute.com/smart-mill-concept.

* cited by examiner

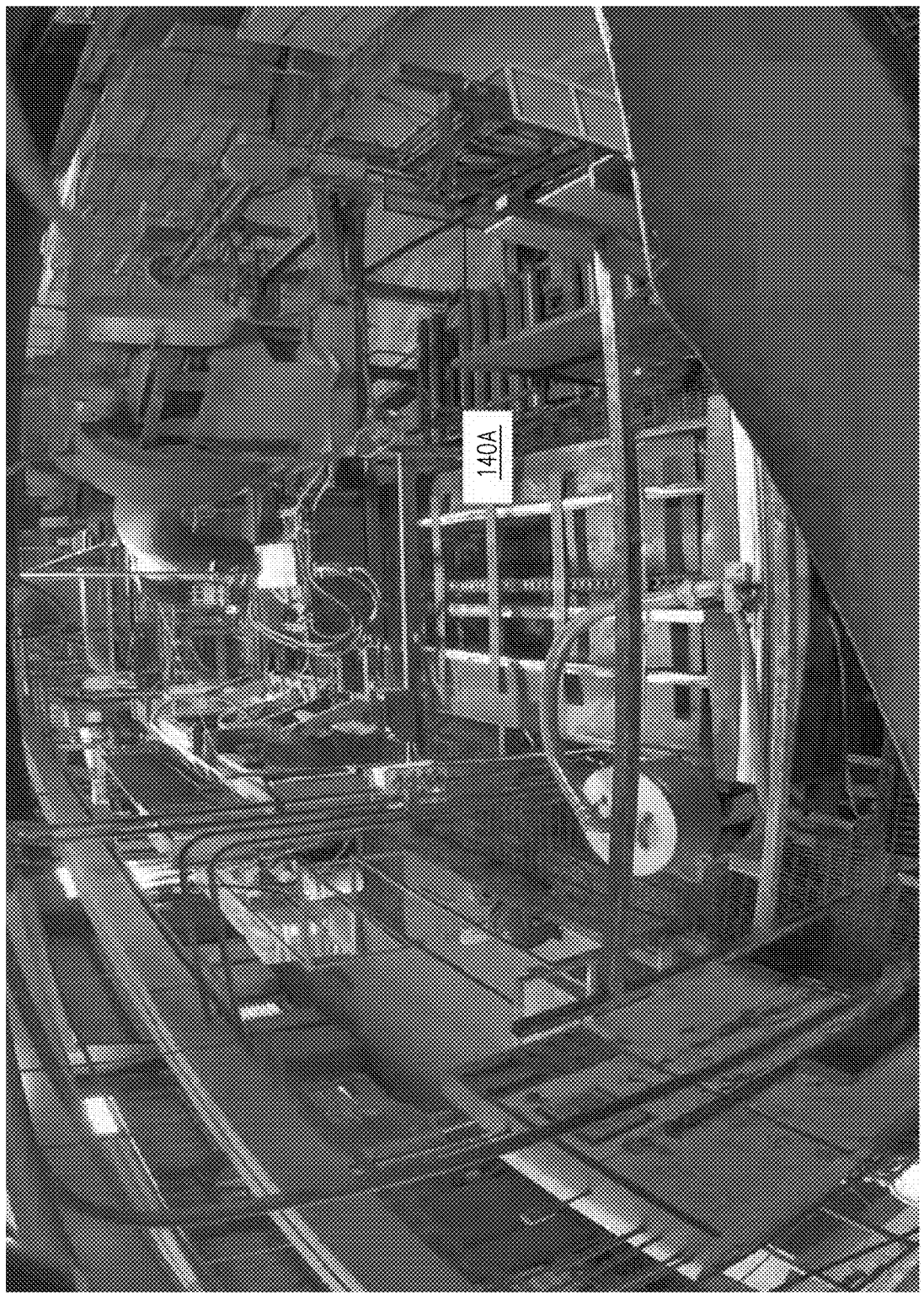

| Panel Type | Quantity | Station ID | 102A | 109A | 123A | 109B | 102B | 109C | 123B | 109D | 102C | 109E | 123C | 109F | 102D | 109G | 123D | 109H | 102E | 109I | 123E | 109J | 102F |
|---|---|---|---|---|---|---|---|---|---|---|---|---|---|---|---|---|---|---|---|---|---|---|---|
| (3) Ply Panels | (3) | | | x | x | x | x | | | | | | x | x | | | | | | | x | x | x |
| (5) Ply Panels | (2) | | x | x | x | x | x | x | x | x | x | x | | x | x | x | x | x | x | x | x | x | |
| (7) ply panels | (1) | | | x | x | x | x | x | x | x | x | x | | | x | | | | | | | | |
| (9) Ply Panels | (1) | | x | x | x | x | x | x | x | x | x | x | x | x | x | x | x | x | x | | x | | |
| (11) ply panels | (1) | | x | x | x | x | x | x | x | x | x | x | x | x | x | x | x | x | x | x | x | x | x |
| (6) ply PLV | (1) | | x | x | | x | x | x | | | x | x | | x | x | x | | x | x | x | | x | x |

FIG. 1E
(PRIOR ART)

METHOD AND SYSTEM FOR LAYERED
WOOD PRODUCT PRODUCTION

RELATED APPLICATIONS

This application is related to Bolton et al., U.S. Pat. No. 10,825,164, issued Nov. 3, 2020 entitled "IMAGING SYSTEM FOR ANALYSIS OF WOOD PRODUCTS," which claims the benefit of David Bolton, U.S. Provisional Patent Application No. 62/595,489, filed on Dec. 6, 2017, entitled "IMAGING SYSTEM FOR ANALYSIS OF WOOD PRODUCTS," which is hereby incorporated by reference in its entirety as if it were fully set forth herein.

This application is related to Bolton et al., U.S. patent application Ser. No. 16/687,311, filed Nov. 18, 2019, entitled "METHOD AND SYSTEM FOR DETECTING MOISTURE LEVELS IN WOOD PRODUCTS USING NEAR INFRARED IMAGING," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

This application is related to Bolton et al., U.S. patent application Ser. No. 16/687,342, filed on Nov. 18, 2019, entitled "METHOD AND SYSTEM FOR DETECTING MOISTURE LEVELS IN WOOD PRODUCTS USING NEAR INFRARED IMAGING AND MACHINE LEARNING," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

This application is related to Bolton et al., U.S. patent application Ser. No. 16/687,369, filed on Nov. 18, 2019, entitled "METHOD AND SYSTEM FOR MOISTURE GRADING WOOD PRODUCTS USING SUPERIMPOSED NEAR INFRARED AND VISUAL IMAGES," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

This application is related to Bolton et al., U.S. patent application Ser. No. 16/697,458, filed Nov. 27, 2019, entitled "METHOD AND SYSTEM FOR ENSURING THE QUALITY OF A WOOD PRODUCT BASED ON SURFACE IRREGULARITIES USING NEAR INFRARED IMAGING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

This application is related to Bolton et al., U.S. patent application Ser. No. 16/697,461, filed on Nov. 27, 2019, entitled "METHOD AND SYSTEM FOR ENSURING THE QUALITY OF A WOOD PRODUCT BASED ON SURFACE IRREGULARITIES USING NEAR INFRARED IMAGING AND MACHINE LEARNING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

This application is related to Bolton et al., U.S. patent application Ser. No. 16/697,466, filed on Nov. 27, 2019, entitled "METHOD AND SYSTEM FOR ADJUSTING THE PRODUCTION PROCESS OF A WOOD PRODUCT BASED ON A LEVEL OF IRREGULARITY OF A SURFACE OF THE WOOD PRODUCT USING NEAR INFRARED IMAGING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

BACKGROUND

There are numerous classes and types of wood products currently used in a virtually limitless variety of construction and other applications. Wood product types include, but are not limited to: raw wood products such as logs, debarked blocks, green or dry veneer, and dimensional lumber; intermediate wood components, such as laminated wood I-beam flanges; and layered wood products such as laminated beams, plywood panels, Parallel Laminated Veneer (PLV) products and Laminated Veneer Lumber (LVL) products.

Layered wood products such as plywood, PLV, and LVL are composite products constructed in a factory from both natural wood and one or more chemically blended glues or resins. They are manufactured on a product assembly line and typically fabricated from multiple layers of thin wood, e.g., veneer sheets, assembled with one or more layers of adhesives bonding the sheets together. These layered wood products sometimes referred to as "man-made" but more commonly referred to as "Engineered Wood" offer several advantages over typical milled lumber. For instance, since layered wood products are fabricated and assembled in a factory under controlled conditions to a set of specific product specifications, they can be stronger, straighter, and more uniform than traditional sawn lumber. In addition, due to their composite nature, layered wood products are much less likely to warp, twist, bow, or shrink than traditional sawn lumber. Layered wood products benefit from the multiple grain orientations of the layers and typically, can also have a higher allowable stress than a comparable milled lumber product. However, as discussed below, to achieve this potential it is often critical that the veneer sheets making up the layered wood products have the correct physical characteristics such as strength, consistent surface texture, and moisture content, combined with the proper application of glue and pressing actions to produce a panel of desired strength, thickness, and visual appearance.

The use of veneer, and particularly veneer that has uniform qualities such as consistent surface texture and moisture content, allows layered wood products of various dimensions to be created without milling a board of the desired thickness or dimension from a single log or single piece of lumber. This, in turn, allows for much more efficient use of natural resources. Indeed, without the use of various layered wood technologies, such as plywood, PLV, and LVL, the forests of the planet would have been depleted long ago simply to meet the construction needs of the ever-increasing world population. In addition, since layered wood products are fabricated in a factory under controlled conditions, layered wood products can be manufactured to virtually any dimensions desired, including dimensions such as length, width, and height well beyond dimensions that can be provided by milling from even the largest trees. Given these products are fabricated to meet specified criteria such as but not limited to: dimension, strength, and appearance, testing if routinely performed to ensure the finished product meets the specifications to which its raw materials, orientation of, and bonding method/composition was composed to achieve. This verification of performance is virtually impossible to achieve with a sawn product.

The use of veneer layers in some layered wood products, such as plywood, PLV, and LVL, can also allow for better structural integrity since any imperfections in a given veneer layer, such as a knot hole, can be mitigated by rotating and/or exchanging layers of veneer so that the imperfection is only one layer deep and is supported by layers of veneer below and above the imperfection in the layered wood products structure. However, these advantages are again dependent on the veneer layers being inspected for consistent surface texture, strength, and moisture content.

As noted, the versatility and potential increased structural integrity and uniformity of layered wood products has resulted in the extensive use of these products and there is little question that layered wood products are a critical component of construction worldwide. However, the currently used methods and systems for producing layered wood products are antiquated and extremely inefficient in terms of the amount and type of equipment required, the amount of factory production space required, the amount of human interaction and coordination required, and the amount of wasted and/or inefficiently used material.

As noted, layered wood products, such as plywood, PLV, and LVL are made of thin layers of veneer. In the case of plywood, in addition to sheets of veneer, layers of "core material" (sheets/partial sheets, or even narrow strips/pieces of veneer) are placed such as to rotate the grain approximately 90 degrees from the sheet, or ply, above and below. These alternating layers of oriented grain material increase the structural rigidity of the panel. Typically, one side (top) of a first sheet of veneer is coated with an adhesive, i.e., glue, and then a layer of core material is applied. Glue is then applied to the layer of core material and a second sheet of veneer is applied to the layer of core material. The resulting three ply structure made up of a first veneer sheet (the first ply), glue, a layer of core material (the second ply), glue, and a second sheet of veneer (the third ply) is referred to as a three-ply "green" panel, with each individual layer of construction, i.e., veneer sheet or core material, within the panel commonly referred to as a "ply". Typically, plywood panels are made up of multiple plys with three to eleven plys or more being common. Once the green panel is created, there remain additional processes that are required to transform the green panel into a cured, or finished, panel. Typically, the first process downstream is to "pre-press" the green panel product. This is typically performed on a stack of green panels with 12-40 panel stacks being common. The typical pre-press is a single opening press into which the entire stack of green panels is conveyed. The press closes, compressing the green panel stack between the upper and lower rigid surfaces of the press. This pressing or "compaction" process is at ambient temperature and ensures all the air gaps between plys in each green panel are eliminated and a quality glue to wood contact is formed throughout the panel. After this pre-pressing action is completed, the resulting "pre-pressed panel" has increased rigidity and the stack of panels is ready for the next process, "Hot Pressing".

The stack of pre-pressed green panels is then conveyed into an unstacking mechanism at the hot press. This mechanism sequentially loads a single pre-pressed green panel from the stack into individual separate heating chambers in the hot press. Essentially sandwiching each pre-pressed green panel between two heated metal plates, commonly referred to as heating platens. When each of the individual heating chambers "Platens" have a pre-pressed green panel loaded, the press closes applying pressure and heat to the pre-pressed green panel. The combination of heat and pressure cures the glue and creates a rigid "cured" panel. In this way a continuous material assembly and processing routine is created essentially consisting of green panel layup, green panel stacking, green panel stack conveyance, prepressing, pre pressed panel stack conveyance, unstacking and hot press loading, hot pressing, hot press unloading/panel stacking, and hot pressed panel stack conveyance to finishing areas.

The production of PLV is similar to plywood production except that core material is typically not used so that each layer, i.e., ply, of PLV is a veneer sheet. In this process, one side "top" of a first sheet/ply of veneer is coated with an adhesive, i.e., glue, and then a second veneer sheet/ply is applied, then glue is applied to the second veneer sheet, and a third sheet/ply of veneer is applied. This process is repeated until the desired number of plys is achieved. The resulting multiple veneer ply structure is called a PLV panel. As with plywood production, the resulting PLV panel is still a green panel, that must be "pre-press" to flatten out the veneer layer components and create the wood to glue bond, and then cured using a "hot press" where both pressure and heat are applied to cure the glue and create a cured panel. As with the plywood example discussed above, multiple green panels are produced, stacked, and sent to the pre-press. Then these pre-pressed panel stacks are sent to the hot press. In this way a continuous material assembly and processing routine is created as described in detail above.

As discussed in detail below, prior art layered wood product assembly methods and systems use a conveyor to move material progressively past multiple feeder stations which apply successive layers of veneer, glue, and core if required, to build a panel of a desired number of plys. This system of conveyor, feeder stations, glue applicators, etc. is commonly referred to as a "Layup Line" When the panel reaches the end of the line, it is discharged to form a stack of green layered wood product panels, as referred to herein simply as "green panel stacks."

From the layup line the green layered wood product stacks are conveyed, typically by a second conveying system, to a pressing area and pressing stations. Typical plants utilize multiple press lines with two press lines being commonly used for small plants and up to eight press lines in large plants.

As discussed above, in the pressing area, the stacks of green layered wood product panels are conveyed to a pre-press machine center typically utilizing hydraulic rams to compact the stack, eliminating air between layers of wood, and promoting an even spread of the glue between layers of veneer. After pre-pressing, the now pre-pressed layered wood product stacks are conveyed into an unstacking mechanism which feeds one pre-pressed layered wood product panel at a time from the stack into a multi opening hot press. Typically, hot presses contain between 12 and 40 individual openings, each of which can process one pre-pressed layered wood product panel. When the hot press is loaded with panels, hydraulic systems close the press and heat is applied to cure the glue. It is this combination of heat and pressure that causes the layered wood product panels to bond and become cured plywood, PLV, or LVL panels.

FIGS. 1A through 1I are various representations of prior art layered wood product methods and systems. For simplicity, the prior art layered wood product methods and systems shown in FIGS. 1A through 1I are associated with the production of traditional plywood products. However, as discussed above, other layered wood product methods and systems are similar except that where a layer of core material is laid down in a traditional plywood product assembly line, for other layered wood products all layers would be veneer sheets. Consequently, with this one exception, in actual practice the same prior art equipment and methods shown in FIGS. 1A through 1I are used for all layered wood products.

FIG. 1A is a diagram representing traditional layered wood product panel assembly layup station 140A. As seen in FIG. 1A traditional layered wood product panel assembly layup station 140A includes traditional panel conveyor 101, which, as discussed later, is a conveyor system that in many cases extends one hundred feet or more, and in some cases three hundred feet or more.

The process of creating a traditional layered wood product panel begins at sheet feeder operator position 121A with a sheet feeder operator SFO1 using a vacuum conveyor 105 of sheet feeder station 102A to move a sheet of veneer 107A from veneer stack 103A to traditional panel conveyor 101. Sheet of veneer 107A then moves via traditional panel conveyor 101 down to first glue applicator 109A. At first glue applicator 109A a layer of glue is applied to a first side of sheet of veneer 107A. Of note is the fact that the amount of glue applied by glue applicator 109A is determined by the flow of glue through glue applicator 109A and the speed of traditional panel conveyor 101. The result is that using prior art methods and systems only a very coarse adjustment can be made to the amount of glue applied by glue applicators such as glue applicator 109A. In addition, if for any reason the speed of traditional panel conveyor 101 changes without a resulting adjustment to the flow of glue through the glue applicators, the result is that too much or too little glue is applied. As discussed below, this, in turn, can adversely affect the quality of the resulting plywood panels.

After glue is applied at glue applicator 109A, the structure is conveyed by traditional panel conveyor 101 to the core feeder station 123A and core stack 113A. At core stack 113A, a core placement operator CO1 places a portion of core material onto the assembly. The assembly then proceeds to a second glue applicator 109B. As seen in FIG. 1A, at this point in the traditional process, even before an entire three-ply panel is created, two distinct glue applicators and at least two people are required.

FIG. 1B is a photograph of an actual traditional layered wood product panel assembly layup station 140A such as that diagramed in FIG. 1A. As can be seen in FIG. 1B, traditional layered wood product panel assembly layup station 140A is of significant size, has many moving parts, and is both complicated and potentially hazardous to operate. In addition, due to the rather large area and set up of traditional layered wood product panel assembly layup station 140A, significant waste products and debris are created that must be removed periodically. This, unfortunately requires the entire line be stopped, as discussed below.

FIG. 1C is a diagram representing a side view of the formation of a three-ply plywood panel being created using a traditional layered wood product panel assembly layup station 140A. As seen in FIG. 1C, at veneer layer sheet feeder operator position 121A SFO1 uses sheet feeder station 102A, to place sheet of veneer 107A on traditional panel conveyor 101. Sheet of veneer 107A then moves along traditional panel conveyor 101 to glue applicator 109A where a layer of glue is applied. Then the structure moves along traditional panel conveyor 101 to core feeder station 123A where CO1 places core material to create a core layer and structure 115A. The structure 115A then moves along traditional panel conveyor 101 to second glue applicator 109B where a layer of glue is applied. Then at veneer layer sheet feeder operator position 121B a second sheet feeder operator SFO2 uses sheet feeder station 102B to place second sheet of veneer on structure 115A to create structure 107B. At this point, structure 107B represents a single three-ply plywood panel.

As noted, FIG. 1C is a representation of the creation of a single three-ply plywood panel structure using prior art methods. However, as noted above, in many cases a plywood panel includes even more plys, often eight or more.

Consequently, for each three plys, structures similar to that shown in FIGS. 1A, 1B, and 1C must be linked together along a very long traditional panel conveyor 101 to create a traditional layered wood product panel assembly layup line including, in practice, layup sheet feeder stations, glue application stations, and core feeder stations cumulatively represented as detailed in 140A.

FIG. 1D is a diagram representing a traditional layered wood product panel assembly layup line 150 including five traditional layered wood product panel assembly layup stations 140A through 140E for creating a single plywood panel structure of up to eleven plys, or a plywood structure of a fewer number of plys, or multiple plywood panels structures of a fewer number of plys. As noted above, many plywood and other layered wood products, include a minimum of 3 plys and eleven or more plys is not uncommon. However, for simplicity of discussion, the illustrative example of a layup line 150 is shown with only five traditional layered wood product panel assembly layup stations 140A through 140E and therefore would produce, at most, an eleven-ply panel. In addition, as discussed in more detail below, by deactivating selected components making up traditional layered wood product panel assembly layup line 150, traditional layered wood product panel assembly layup line 150 could be used to create a plywood structure of a fewer number of plys, or multiple plywood panels structures of a fewer number of plys.

FIG. 1E details the most common component activations of various components of the traditional layered wood product panel assembly layup line 150 of FIG. 1D for construction of common panels on this specific configuration of a traditional layup line.

In operation, the process of creating a traditional layered wood product panel using traditional layered wood product panel assembly layup line 150 begins at sheet operator position 121A with a sheet feeder operator SFO1 using a vacuum conveyor of sheet feeder station 102A to move a sheet of veneer 107A from veneer stack 103A to traditional panel conveyor 101. Sheet of veneer 107A then moves via traditional panel conveyor 101 down to first glue applicator 109A. At first glue applicator 109A a layer of glue is applied to a top side of sheet of veneer 107A. Of note is the fact that the amount of glue applied by glue applicators 109A through 109J is determined by the flow of glue through glue applicator 109A and the speed of traditional panel conveyor 101. The result is that using prior art methods and systems only a very coarse adjustment can be made to the amount of glue applied by glue applicators such as glue applicator 109A through 109J. In addition, if for any reason the speed of traditional panel conveyor 101 changes without a resulting adjustment to the flow of glue through the glue applicators the result is that too much or too little glue is applied. As discussed below, this, in turn, can adversely affect the quality of the resulting plywood panels.

After glue is applied at glue applicator 109A, the structure is conveyed by traditional panel conveyor 101 to the core feeder station 123A and core stack 113A. At core stack 113A, a first core placement operator CO1 places a portion of core material onto the assembly. The resulting structure 115A then moves along traditional panel conveyor 101 to second glue applicator 109B where a layer of glue is applied. Then at veneer layer sheet feeder operator position 121B a second sheet feeder operator SFO2 uses sheet feeder station 102B, to place a second sheet of veneer from veneer stack 103B on structure 115A to create structure 107B. At this point, structure 107B represents a three-ply plywood panel structure.

Referring to FIGS. 1D and 1E together, it is worth noting that if only a three-ply wood product panel is desired, then third glue applicator 109C and fourth glue applicator 109D would be deactivated along with core feeder station 123B. However, if a five ply or greater panel structure is desired, structure 107B then moves along traditional panel conveyor 101 to third glue applicator 109C where a layer of glue is applied. Then the structure moves along traditional panel conveyor 101 to core feeder station 123B and core stack 113B where a second core operator CO2 places core material on structure 107B to create a core layer. The resulting structure 115B then moves along traditional panel conveyor 101 to fourth glue applicator 109D where a layer of glue is applied. Then at veneer layer sheet feeder operator position 121C a third sheet feeder operator SFO3 uses sheet feeder station 102C to place a third sheet of veneer from veneer stack 103C on structure 115B to create structure 107C. At this point, structure 107C represents a five-ply plywood panel structure.

Referring to FIGS. 1D and 1E together, it is again worth noting that if only a five-ply wood product panel is desired, then fifth glue applicator 109E and sixth glue applicator 109F would be deactivated along with core feeder station 123C. However, if a six ply or more structure is desired, structure 107C then moves along traditional panel conveyor 101 to fifth glue applicator 109E where a layer of glue is applied. Then the structure moves along traditional panel conveyor 101 to core feeder station 123C where a third core operator CO3 places core material from core stack 113C on the structure to create a core layer. The resulting structure 115C then moves along traditional panel conveyor 101 to sixth glue applicator 109F where a layer of glue is applied. Then at veneer layer sheet feeder operator position 121D a fourth sheet feeder operator SFO4 uses sheet feeder station 102D to place a fourth sheet of veneer from veneer stack 103D on structure 115C to create structure 107D. At this point, structure 107D represents a seven-ply plywood panel structure.

Referring to FIGS. 1D and 1E together, it is again worth noting that if only a seven-ply wood product panel is desired, then seventh glue applicator 109G and eighth glue applicator 109H would be deactivated along with core feeder station 123D. However, if an eight-ply or more structure is desired, structure 107D then moves along traditional panel conveyor 101 to seventh glue applicator 109G where a layer of glue is applied. Then the structure moves along traditional panel conveyor 101 to core feeder station 123D where a fourth core operator CO4 places core material from core stack 113D on the structure to create a core layer. The resulting structure 115D then moves along traditional panel conveyor 101 to eighth glue applicator 109H where a layer of glue is applied. Then at veneer layer sheet feeder operator position 121E a fifth sheet feeder operator SFO5 uses sheet feeder station 102E, to place a fifth sheet of veneer from veneer stack 103E on structure 115D to create structure 107E. At this point, structure 107E represents a nine-ply plywood panel structure.

Referring to FIGS. 1D and 1E together, it is again worth noting that if only a nine-ply wood product panel is desired, then ninth glue applicator 109I and tenth glue applicator 109J would be deactivated along with core feeder station 123E and veneer layer sheet feeder operator position 121F. However, if a nine-ply or more structure is desired, structure 107E then moves along traditional panel conveyor 101 to ninth glue applicator 109I where a layer of glue is applied. Then the structure moves along traditional panel conveyor 101 to core feeder station 123E and core pile 113E where a fifth core operator CO5 places core material from core stack 113E on the structure to create a core layer. The resulting structure 115E then moves along traditional panel conveyor 101 to tenth glue applicator 109J where a layer of glue is applied. Then at veneer layer sheet feeder operator position 121F a sixth sheet feeder operator SFO6 uses sheet feeder station 102F to place a sixth sheet of veneer from veneer stack 103F on structure 115E to create structure 107F. At this point, structure 107F represents an eleven-ply plywood panel structure.

As seen above, by activating or deactivating various glue applicators, core feeding stations, and/or veneer layer sheet feeder operator positions, traditional layered wood product panel assembly layup line 150, including five traditional layered wood product panel assembly layup stations 140A through 140E, can be used for creating a single plywood panel structure of up to eleven plys, or a plywood structure of a fewer number of plys, or multiple plywood panels structures of a fewer number of plys. However, this requires significant coordination and tracking of complicated components and represents one of numerous opportunities to introduce mechanical and/or human error into these prior art systems and methods as discussed above and depicted in FIGS. 1D and 1E.

Green panel structure 107F is then moved by traditional panel conveyor 101 to stacker 124 and stacker operator SO. At stacker 124 multiple green panel structures, such as green panel structure 107F, are stacked into green panel stacks 160 for conveyance to the press area of FIG. 4F discussed below. In many cases, green panel stacks 160 can include forty or more individual green panel structures, such as green panel structure 107F. Consequently, each stack 160 represents a significant investment of resources.

FIG. 1F is a photograph of an actual traditional layered wood product panel assembly layup line 150 including multiple traditional layered wood product panel assembly layup stations such as that diagramed in FIG. 1D.

As seen above, traditional layered wood product panel assembly layup line 150 is a very space intensive structure that extends hundreds of feet. Therefore, traditional layered wood product panel assembly layup line 150 is expensive in terms of factory floor footprint alone. In addition, the size of traditional layered wood product panel assembly layup line 150 also means that housekeeping requirements are continuous and extensive to prevent these large portions of the factory floor from becoming covered with debris, i.e., glue and wood particles. to keep the machinery running and ensure a safe working environment. As noted above, this typically requires continuous housekeeping in the areas safely accessible during operation, and for those areas where moving equipment is located, the entire traditional layered wood product panel assembly layup line 150 has to be shut down to perform housekeeping.

These are significant costs to maintain an acceptable clean and safe working environment. However, the cost of traditional layered wood product panel assembly layup line 150 is even more evident in the number of moving parts and personnel required to operate traditional layered wood product panel assembly layup line 150. For the eleven-ply layup line shown in traditional layered wood product panel assembly layup line 150 there must be a minimum of: a hundred foot or more traditional panel conveyor; six automated sheet feeder stations, six veneer stacks, and six sheet feeder operators; five core stacks and five core operators; ten glue applicators; a stacker and stacker operator; several forklift and stack replenishing operators; and multiple motors and control and communication systems. This requires thousands of moving parts and sensors, and at least twelve people, all of which must function accurately, safely, and in close coordination. This is a huge maintenance effort and a huge cost in terms of investment of man-hours. In addition, as discussed below, when there is a glitch in any of the thousands of moving parts, or there is any human error generated by the numerous human workers, often the entire line must be stopped, or at a minimum there is product degredation, or both Not only is this inefficient, in and of itself in terms of time, but the increased time period between the glue application and the time when the panel is pressed impacts the glue bonding ability. Consequently, when the line is stopped for any error, or any reason, for more than a short interval, product quality is impacted and longer intervals often results in large amounts of product waste.

In addition, while the reader can easily recognize the use and maintenance of traditional layered wood product panel assembly layup line 150 is significant, traditional layered wood product panel assembly layup line 150 is only an eleven-ply assembly layup line. Therefore larger installations are proportionately more complicated, have proportionately more moving parts, and require proportionately more human operators.

The resultant product of traditional layered wood product panel assembly layup line 150 are green panel stacks 160 of multiple green panel structures such as green panel structure 107F. Like all green panels, these structures must be pressed and cured to create finished layered wood products. This process involves moving green panel stacks 160 to one or more press lines where each stack is first pre-pressed in a cold press to flatten the composite green panel structures and then to a hot press where individual pre pressed panels are subjected to pressure and heat to cure the glue and yield finished layered wood panels.

FIG. 1G is a diagram representing a traditional layered wood product panel assembly layup and press line 151 including traditional layered wood product panel assembly layup line 150 of FIG. 1D, stack press delivery line 162, and four pressing stations 153 through 159.

As seen in FIG. 1G, traditional layered wood product panel assembly layup and press line 151 includes stack production and processing section 199. Stack production and processing section 199 includes traditional layered wood product panel assembly layup line 150 and stack press delivery line 162 that is a conveyor moving multiple green panel stacks 160 to pressing stations 153 through 159.

As seen in FIG. 1G, stack press delivery line 162 conveys green panel stacks 160 to pressing stations 153 through 159 in a continuous movement and individual green panel stacks 160 are positioned in each press line. In FIG. 1G these include green panel stack 160A to press line 153, green panel stack 160B to press line 155, green panel stack 160C to press line 157, and green panel stack 160D to press line 159. In practice, the number of press lines can be fewer or more than the four shown in FIG. 1G. It is important to note that stack press delivery line 162 continues to convey green panel stacks 160 to pressing stations 153 through 159 as green panel stacks 160A through 160D are being processed at pressing stations 153 through 159, respectively.

As seen in FIG. 1G, green panel stacks 160A through 160D are processed at pressing stations 153 through 159, respectively, by press operators PO1, PO2, PO3, and PO4, respectively. Green panel stacks 160A through 160D are first loaded into pre-presses 170A, 170B, 170C, and 170D, respectively, where the green panel stacks 160A through 160D are subjected to cold pre-pressing. In the cold pre-presses 170A, 170B, 170C, and 170D, green panel stacks 160A through 160D are pressed to flatten out the structures and force out any air pockets that may exist in the green panel stacks 160A through 160D.

FIG. 1H is a photograph of an actual pre-press 170 such as any of the pre-presses 170A through 170D of FIG. 1G. It is important to note that each of cold pre-presses 170A, 170B, 170C, and 170D can, in some instances, be capable of processing green panel stacks 160 of different sizes, i.e., of differing numbers of green layered wood structure panels. This is an important factor because it can require significant coordination between the stacker operator SO and each of the press operators PO1, PO2, PO3, and PO4. Otherwise the wrong size green panel stack could be loaded into a cold press that is unable to process it.

The resulting pre-pressed stacks 161A, 161B, 161C, and 161D are conveyed into an unstacking mechanism which feeds one layered wood structure panel at a time from the pre-pressed stacks 161A, 161B, 161C, and 161D into slots of one or more multi-opening hot presses 180A, 180B. 180C, and 180D, respectively. At hot presses 180A, 180B. 180C, and 180D the layered wood structure panels making up pre-pressed stacks 161A, 161B, 161C, and 161D are subjected to pressure and heat to compress and cure the layered wood structure panels making up pre-pressed stacks 161A, 161B, 161C, and 161D. Then the layered wood structure panels are re-stacked resulting in cured layered wood panel product stacks 163A, 163B, 163C, and 163D, respectively.

FIG. 1I is a photograph of an actual hot press 180 such as any of the hot presses 180A through 180D of FIG. 1G. It is important to note that, like each of cold pre-presses 170A, 170B, 170C, and 170D, each of hot presses presses 180A, 180B, 180C, and 180D can, in some instances, be capable of processing pre-pressed stacks 161A, 161B, 161C, and 161D of different sizes, i.e., of differing numbers of layered wood product panels. This is an important factor because it also can require significant coordination between the stacker operator SO and each of the press operators PO1, PO2, PO3, and PO4. Otherwise the wrong size stack could be loaded into a hot press that is unable to process it. Some hot presses can handle pre-pressed stacks of up to forty or more layered wood structure panels.

Cured layered wood panel product stacks 163A, 163B, 163C, and 163D are then conveyed to panel trim, quality analysis, and shipping area 111 where the individual layered wood panels making up cured layered wood panel product stacks 163A, 163B, 163C, and 163D are trimmed to size, subjected to quality control analysis, and then shipped to customers.

In addition to the cost of operating traditional layered wood product panel assembly layup and press line 151, including stack production and processing section 199, i.e., traditional layered wood product panel assembly layup line 150 and stack press delivery line 162, there is a significant cost associated with any delays in traditional layered wood product panel assembly layup and press line 151 and/or pressing stations 153 through 159 which, in the prior art, are commonly fed by traditional layered wood product panel assembly layup line 150. These delays include delays due to failure of any of the thousands of moving parts associated with traditional layered wood product panel assembly layup and press line 151, and particularly stack production and processing section 199, or any human error introduced by the twelve or more people required to operate traditional layered wood product panel assembly layup and press line 151

Referring to FIGS. 1D and 1F together, when a delay occurs, for whatever reason, the layers of glue applied by glue applicators 109A through 109J may dry out before the green panel stacks 160 reach the pressing stations 153 through 159. This, in turn, results in layered wood product panels that can separate or otherwise fail because the glue could not cure and adhere the layers properly. Unfortunately, this results in significant loss of product using traditional layered wood product panel assembly layup and press line 151. Currently there is an average loss of product to defects of ten percent or more using traditional layered wood product panel assembly layup and press line 151.

As shown above, prior art methods and systems for producing layered wood products suffer from several serious drawbacks. As noted, prior art systems for producing layered wood products are of large physical size, e.g., hundreds of feet, and therefore require substantial factory floor space.

In addition, prior art methods and systems for producing layered wood products have thousands of moving parts and sensors. This makes prior art methods and systems for producing layered wood products extremely maintenance intensive.

In addition, prior art methods and systems for producing layered wood products, including traditional conveyor systems 101 and 162 use a large number of electric motors with substantial power consumption during operation. This makes prior art methods and systems for producing layered wood products expensive to operate and a drain on the environment.

In addition, prior art methods and systems for producing layered wood products are manpower intensive for operation and maintenance. This makes prior art methods and systems for producing layered wood products not only expensive to operate but also subject to human error and a source of potential injury.

In addition, any failure of any one of the thousands of moving parts required by prior art methods and systems for producing layered wood products, or any human error introduced, results in the entire lay-up line and process stopping until repaired. As also noted above, these stoppages often result in substantial product waste due to glue degradation, i.e., glue dry out. In cases where product is lost to an extended stoppage, hundreds of potential layered wood product panels can be lost. As noted above, this significantly contributes to ten percent or more of potential product currently being discarded.

In addition, using prior art methods and systems for producing layered wood products, material and glue systems are configured to run a single product at a time, i.e., only a three-ply count panel, or single type of product (plywood or PLV), at a time. Changing products requires stopping the machine, removing all in process material, and then reconfiguring controls for new product construction.

In addition, using prior art methods and systems for producing layered wood products, glue spread rates are only manually adjustable and in rather large incremental steps. Consequently, it is difficult to make fine adjustments to the amount of glue applied to compensate for ambient temperature, line speed changes, etc.

In addition, using prior art methods and systems for producing layered wood products, the quality of veneer fed into process is not inspected during feeding operation. Therefore, undetected defects can cause panels to be rejected downstream after significant time and energy has already been devoted to the panels, i.e., pressing is complete and panel quality is analyzed.

In addition, using prior art methods and systems for producing layered wood products, no direct correlation is made, or can readily be made, between individual panel quality and the assembly process variables used for construction of that specific panel.

Finally, using prior art methods and systems for producing layered wood products, housekeeping, i.e., keeping the workplace clean and safe, is a challenge due to physical size, physical construction, and operational characteristics discussed above.

Consequently, prior art methods and systems for producing layered wood products are extremely expensive to operate and extremely inefficient.

What is needed is a method and system for producing layered wood products that addresses the shortcoming of prior art methods and systems for producing layered wood products and thereby provides a solution to the long standing problem of providing a method and system for producing layered wood products that is less expensive to operate and more efficient.

SUMMARY

Embodiments of the present disclosure provide an effective and efficient technical solution to the long-standing technical problem of providing a method and system for producing layered wood products that is less expensive to operate and more efficient than prior art methods.

In one embodiment, local robotic panel assembly cells are disclosed including: one or more veneer handling robots; one or more glue application robots; and, in some embodiments, one or more core handling robots, In accordance with the disclosed embodiments, the local robotic panel assembly cells are used to locally and independently produce stacks of layered wood product panels at, or near, the pressing stations. As disclosed, the local robotic panel assembly cells operate independently to assemble the stacks at static locations local to the pressing stations and as the stacks are required. Consequently, using the disclosed embodiments, the stacks of layered wood product panels are built independently and locally at the pressing stations thereby eliminating the need for traditional panel conveyors, traditional layered wood product panel assembly layup lines, and stack press delivery lines. This, in turn, eliminates thousands of moving parts and dozens of people from the layered wood product production process.

Consequently, using the disclosed embodiments, many of the shortcomings of prior art are minimized or by-passed/resolved. For instance, using the methods and systems for producing layered wood products disclosed herein there is the no need for traditional panel conveyors, traditional layered wood product panel assembly layup lines, nor stack press delivery lines. Therefore, the large physical size, e.g., hundreds of feet, of factory floor space required by prior art methods and systems are not needed.

In addition, since using the methods and systems for producing layered wood products disclosed herein there is no need for traditional panel conveyors, traditional layered wood product panel assembly layup lines, nor stack press delivery lines, the thousands of moving parts and sensors required by prior art methods and systems are no longer required nor utilized. This makes the disclosed methods and systems for producing layered wood products much less maintenance intensive and is far less susceptible to failure.

In addition, since using the methods and systems for producing layered wood products disclosed herein there is no need for traditional panel conveyors, traditional layered wood product panel assembly layup lines, nor stack press delivery lines, there is no need of the large number of electric motors and substantial power consumption required by prior art methods and systems. This makes the disclosed methods and systems for producing layered wood products less expensive to operate and a less of a drain on the environment.

In addition, since using the methods and systems for producing layered wood products disclosed herein there is the no need for traditional panel conveyors, traditional layered wood product panel assembly layup lines, nor stack press delivery lines, the disclosed methods and systems are less manpower intensive for operation and maintenance. This makes the disclosed methods and systems for producing layered wood products not only less expensive to operate but also less subject to human error and potential injury.

In addition, unlike prior art methods and systems, any failure of any one of the substantially fewer moving parts required by the disclosed methods and systems for producing layered wood products, or any human error introduced, does not result in substantial product waste due to glue degradation, i.e., glue dry out. This is because using the methods and systems for producing layered wood products disclosed herein the stacks of layered wood product panels are built locally and independently at the pressing stations so there is, at most, only one stack that may be lost if there is a failure in the associated pressing station. This means a loss of, at most, forty layered wood product panels, as compared to a potential loss of four hundred or more panels using prior art methods and systems.

In addition, unlike prior art methods and systems, using the methods and systems for producing layered wood products disclosed herein material and glue systems can be configured to run multiple products at a time, i.e., multiple ply count panels and/or multiple types of product (plywood or PLV), at a time. This is because using the methods and systems for producing layered wood products disclosed herein the stacks of layered wood product panels are built at the pressing stations independently of each other. Consequently, each pressing station has its own robot panel assembly cell and each robot panel assembly cell can be directed/controlled by control signals to assemble a different product.

In addition, unlike prior art methods and systems, using the methods and systems for producing layered wood products disclosed herein glue application robots are used to assemble each stack. These glue application robots apply the glue by moving back and forth over the structure, as opposed to having the structure move beneath the glue applicator. Consequently, glue spread rates can be very precisely controlled and it is relatively simple to make fine adjustments to the amount of glue applied to compensate for ambient temperature, line speed changes, etc.

In addition, unlike prior art methods and systems, using the methods and systems for producing layered wood products disclosed herein the robot panel assembly cells and control systems can be used to make a direct correlation between individual panel quality and the assembly process variables/control signals used for construction of that specific panel.

In addition, since using the methods and systems for producing layered wood products disclosed herein there is no need for traditional panel conveyors, traditional layered wood product panel assembly layup lines, nor stack press delivery lines, housekeeping, i.e., keeping the workplace clean and safe, is a much simpler since the assembly locations are static and of relatively small physical size. In addition, since using the methods and systems for producing layered wood products disclosed herein each robot panel assembly cell can operate a local robot panel assembly and pressing line completely independently of other local robot panel assembly and pressing lines, when keep up is required at one local robot panel assembly and pressing line, only that local and independently operating robot panel assembly and pressing line need be shut down while the other local robot panel assembly and pressing lines continue to operate.

In addition, in one embodiment, the disclosed method and system for producing layered wood products includes a veneer inspection/grading robot and an inspection/grading system which is used to determine the quality of veneer fed into process during feeding operation. Therefore, defects can be detected, and the veneer sheets can be graded before significant time and energy has already been devoted to the panels.

As a result of these and other disclosed features, which are discussed in more detail below, the disclosed embodiments address the short comings of the prior art.

BRIEF DESCRIPTION OF THE DRAWINGS

FIG. 1B is a photograph of an actual traditional layered wood product panel assembly layup station such as that diagramed in FIG. 1A.

FIG. 1E is a chart detailing the most common component activations of various components of the traditional layered wood product panel assembly layup line of FIG. 1D.

Figure 1A:
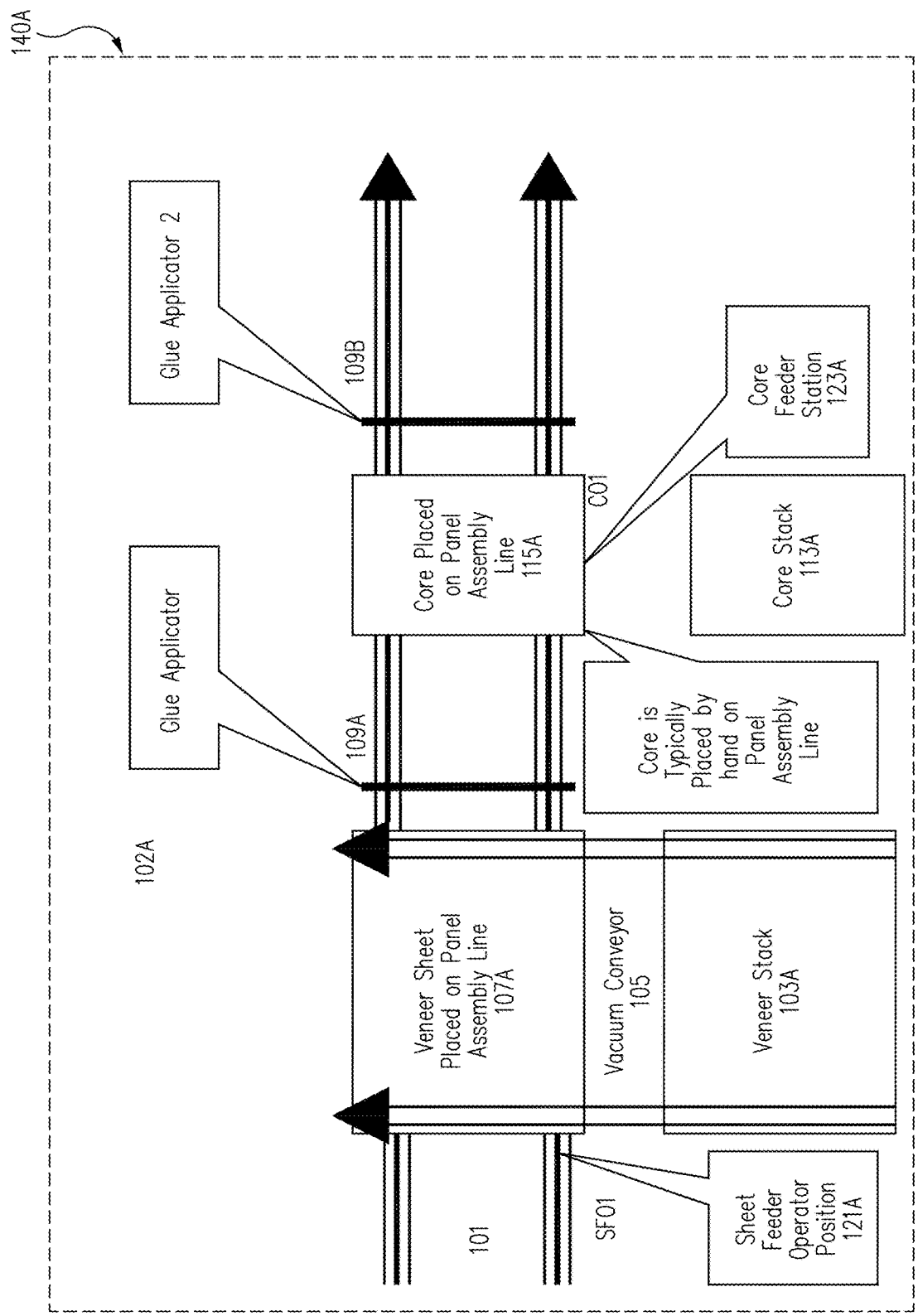
FIG. 1A is a diagram representing traditional layered wood product panel assembly layup station.
Figure 1C:
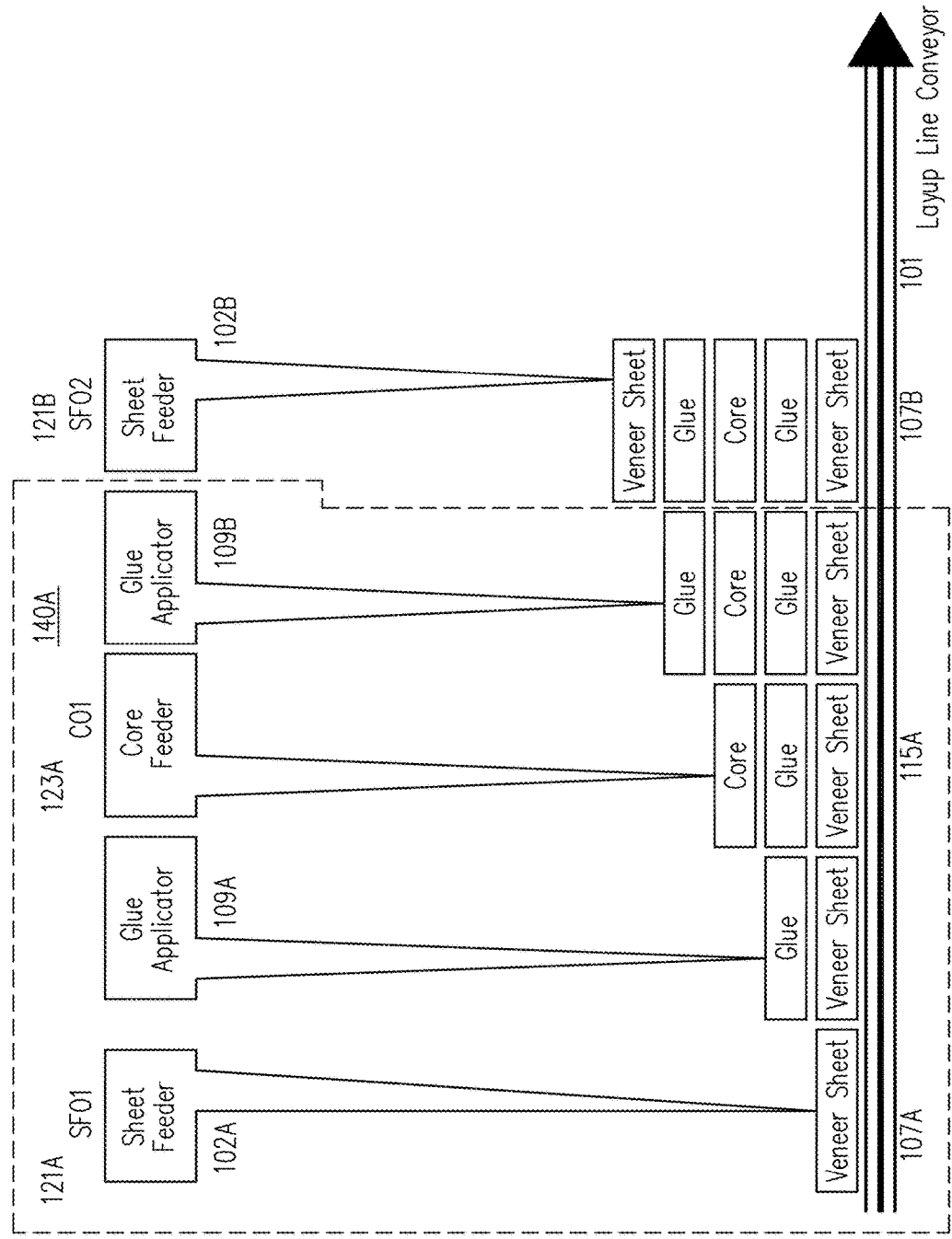
FIG. 1C is a diagram representing a side view of the formation of layers, or plys, being created using a traditional layered wood product panel assembly layup station.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

The disclosed embodiments of methods and systems for layered wood product production include a local robotic panel assembly and pressing system. In one embodiment, the disclosed local robotic panel assembly and pressing system includes one or more local robotic panel assembly cells. In one embodiment, each local robotic panel assembly cell includes: one or more veneer handling robots; one or more glue application robots; and, in some embodiments, one or more core handling robots. According to the disclosed embodiments, the local robotic panel assembly cells are used to independently produce stacks of layered wood product panels at static positions at, or near, the pressing stations. Consequently, the disclosed local robotic panel assembly cells replace the prior art traditional panel conveyors, traditional layered wood product panel assembly layup lines, and stack press delivery lines discussed above with respect to FIGS. 1A through 1I. This, in turn, eliminates thousands of moving parts and dozens of people from the layered wood product production process. In addition, using the disclosed embodiments, hundreds of square feet of factory floor space traditionally used in the layered wood product production process are no longer required.

Consequently, using the disclosed embodiments, many of the shortcomings of prior art are minimized or by-passed/resolved. In addition, as discussed below, using the disclosed embodiments, not only are there significant cost savings in the layered wood product production process, but the resulting layered wood products produced using the disclosed embodiments are of a higher and more consistent quality.

Figure 2A:
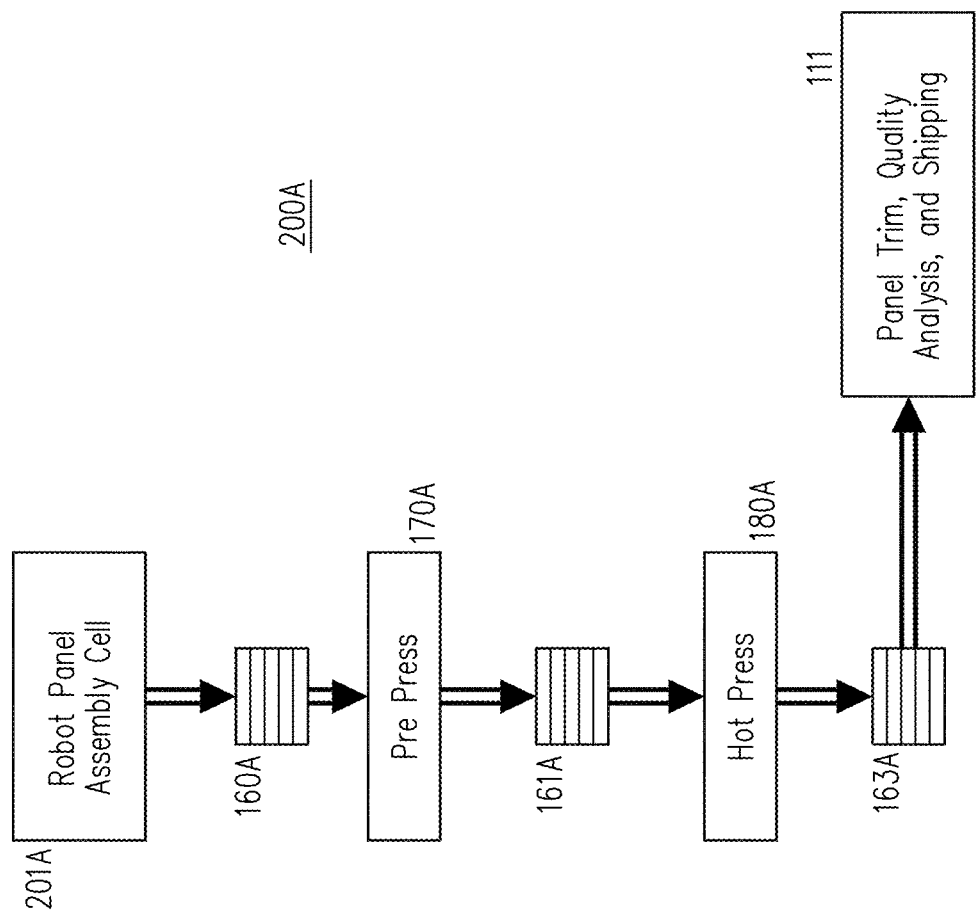
FIG. 2A is a diagram of a local robotic panel assembly and pressing station in accordance with one embodiment.

FIG. 2A is a high-level diagram of a local robotic panel assembly and pressing station 200A in accordance with one embodiment. As seen in FIG. 2A, local robotic panel assembly and pressing station 200A includes robot panel assembly cell 201A that is used to create green panel stacks, such as green panel stack 160A.

Figure 1D:
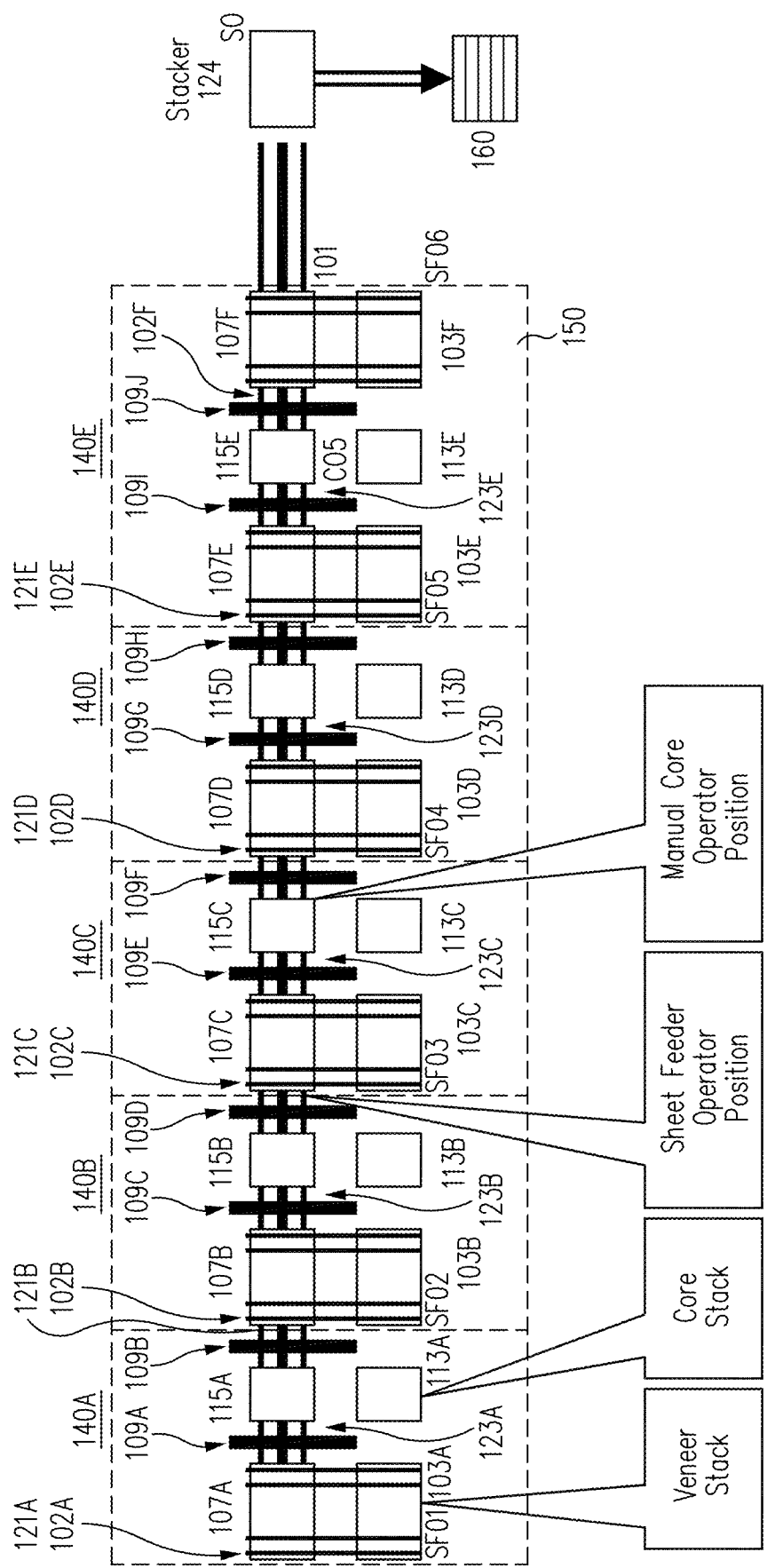
FIG. 1D is a diagram representing a traditional layered wood product panel assembly layup line including five traditional layered wood product panel assembly layup stations.
Figure 1F:
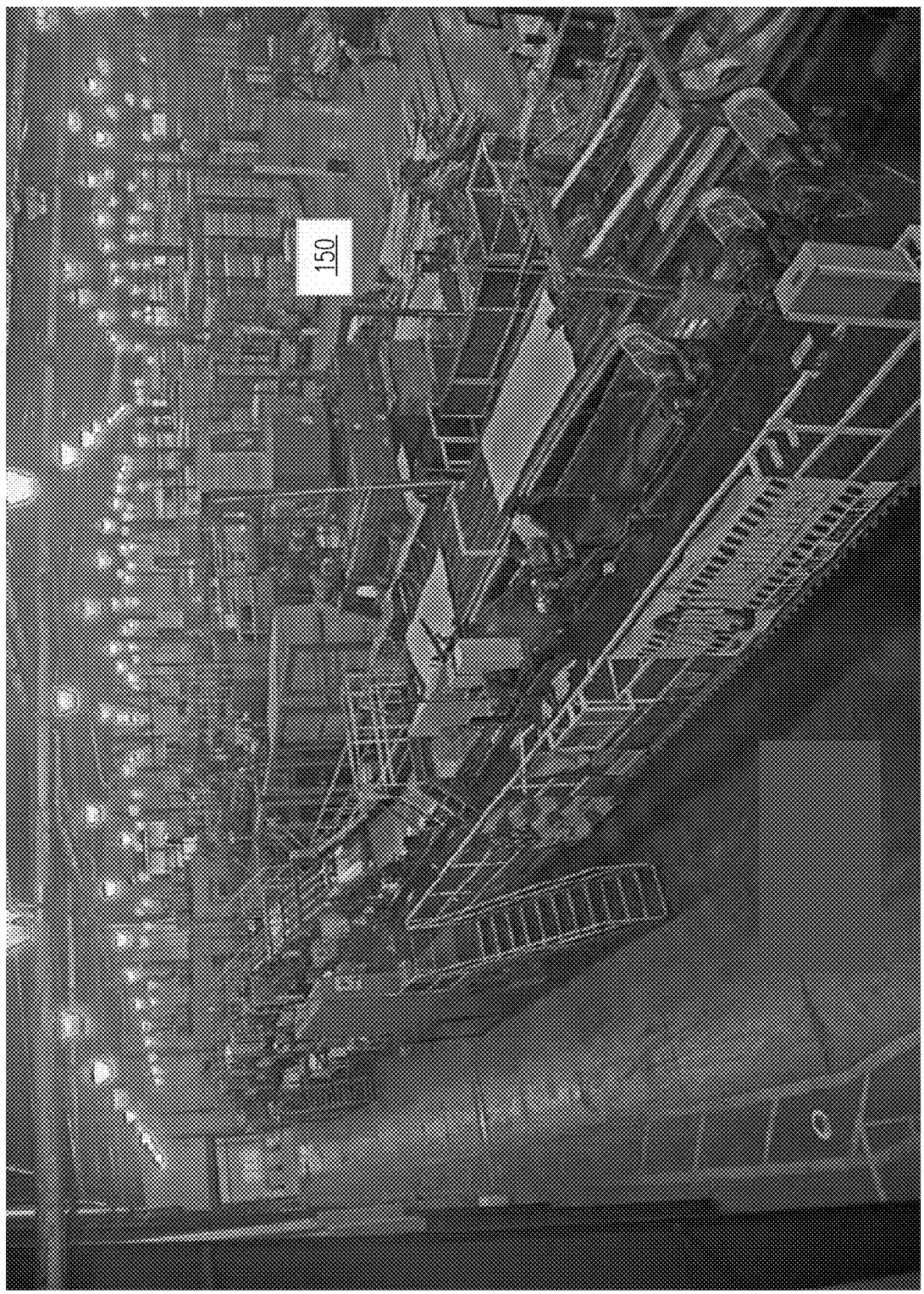
FIG. 1F is a photograph of an actual traditional layered wood product panel assembly layup line including five traditional layered wood product panel assembly layup stations such as that diagramed in FIG. 1D.
Figure 1G:
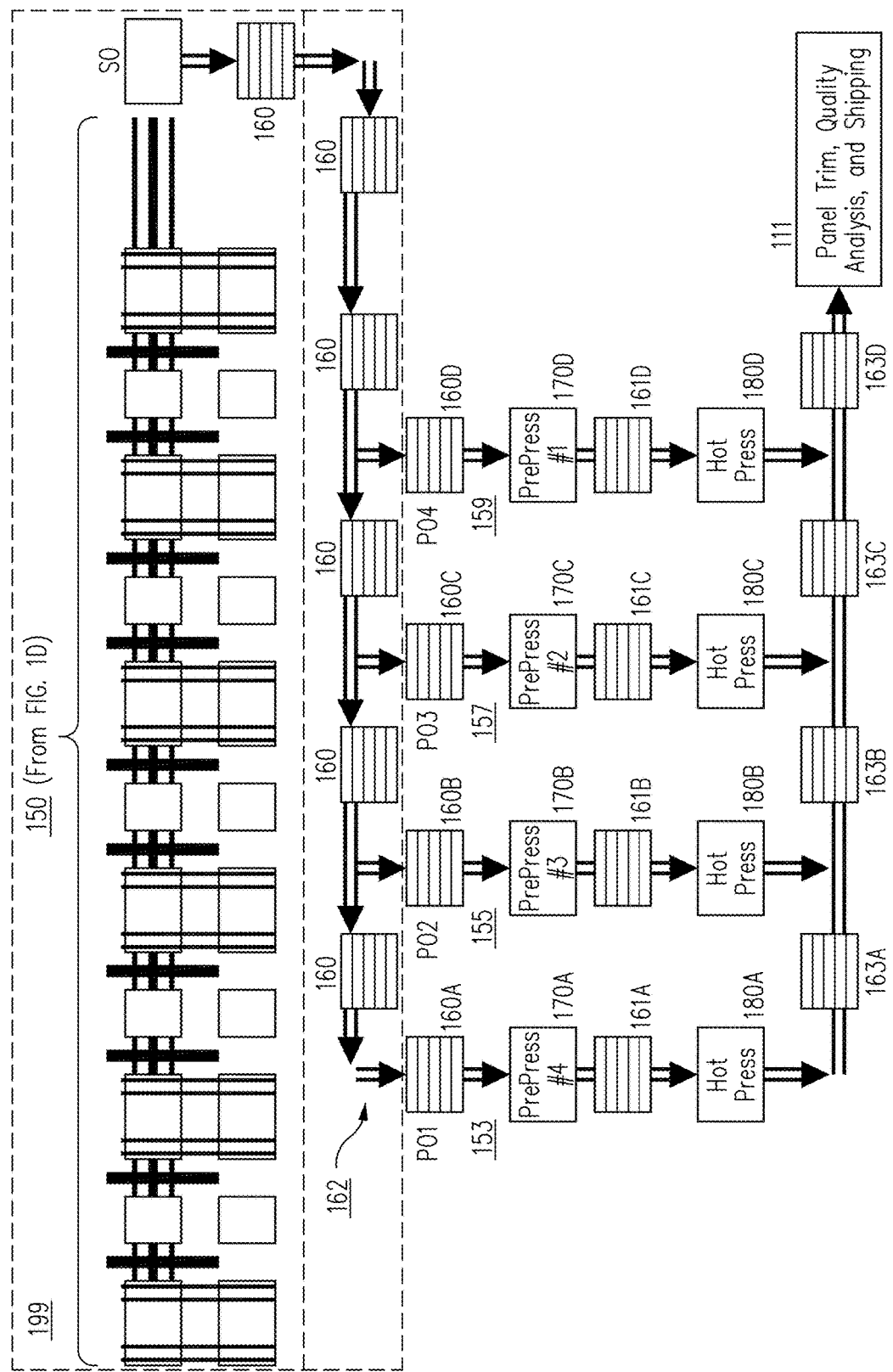
FIG. 1G is a diagram representing a traditional layered wood product panel assembly layup and press line including the traditional layered wood product panel assembly layup line of FIG. 1D and a press area including four pressing stations.
Figure 1I:
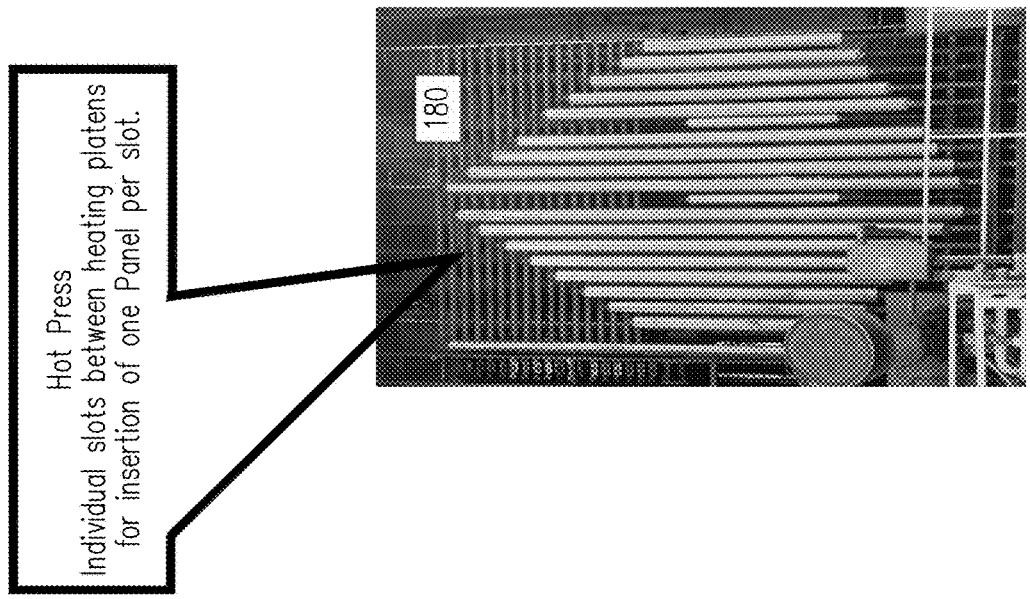
FIG. 1I is a photograph of an actual hot press such as any of the hot presses as any of the pre-presses of any of the FIGs. included herein.
Figure 1H:
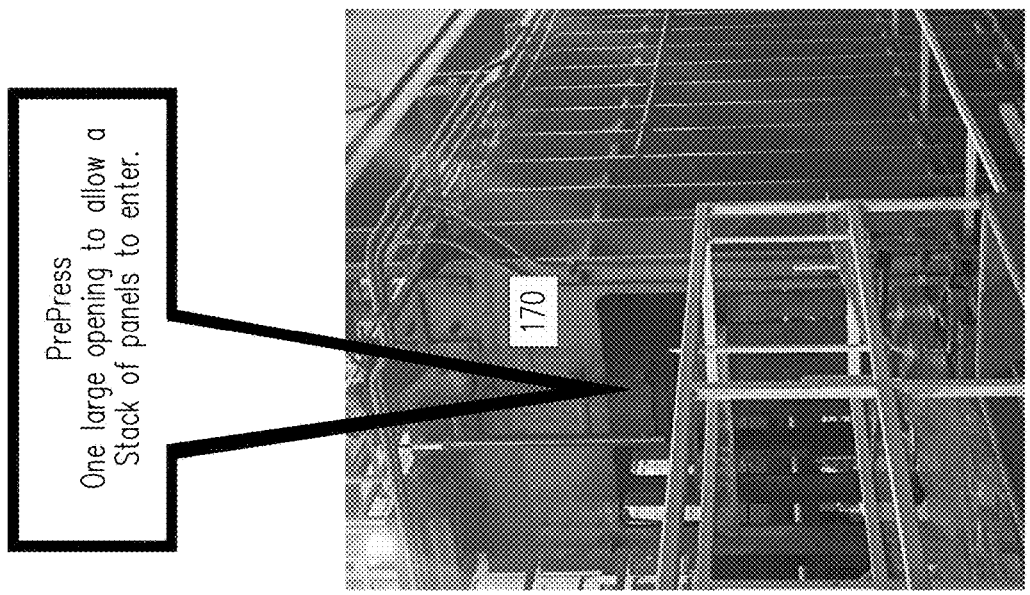
FIG. 1H is a photograph of an actual pre-press such as any of the pre-presses of any of the FIGs. included herein.

It is worth noting that green panel stack 160A of FIG. 2A produced by robot panel assembly cell 201A is virtually identical to green panel stack 160A of FIG. 1G, or any of the green panel stacks 160 of FIGS. 1D or FIG. 1G. Consequently, robot panel assembly cell 201A literally replaces all of the prior art structure shown in as FIG. 1D and the stack production and processing section 199 of FIG. 1G, including traditional layered wood product panel assembly layup line 150 and stack press delivery line 162. This alone means that local robotic panel assembly and pressing station 200A eliminates the need for hundreds of square feet of floor space, thousands of moving parts, multiple sensors and motors, and dozens of sub-assemblies and human operators.

As also seen in FIG. 2A, once robot panel assembly cell 201A creates green panel stack 160A, green panel stack 160A is transferred to pre-press 170A and green panel stack 160A is loaded into pre-press 170A where the green panel stack 160A is subjected to cold pre-pressing in the same pre-pressing process as discussed above. In the press 170A green panel stack 160A is pressed to flatten out the structure and force out any air pockets that may exist in the green panel stack 160A and to create pre-pressed stack 161A.

Once pre-pressed stack 161A is created, pre-pressed stack 161A is conveyed to an unstacking mechanism (not shown) which feeds the layered wood structure panels making up pre-pressed stack 161A one at a time into slots of hot press 180A and is then subjected to hot pressing in the same pre-pressing process as discussed above. At hot press 180A the layered wood structure panels making up pre-pressed stack 161A are subjected to further pressure and heat to further flatten and cure the layered wood structure panels making up pre-pressed stack 161A. The layered wood structure panels are then re-stacked to form cured layered wood panel product stack 163A.

Cured layered wood panel product stack 163A is then conveyed to panel trim, quality analysis, and shipping area 111 where the individual layered wood panels making up cured layered wood panel product stack 163A are trimmed to size, subjected to quality control analysis, and then shipped to customers.

As noted, the pressing and trimming/quality control/shipping process shown in FIG. 2A is virtually identical to the pressing and finishing/quality control/shipping process discussed above with respect to FIG. 1G. Thus, according to one embodiment, once robot panel assembly cell 201A creates green panel stack 160A, green panel stack 160A is processed in the same manner, and using the same equipment, as is used to traditionally process layered wood products. Consequently, existing cold and hot press equipment need not be replaced. Therefore, the use of the disclosed local robotic panel assembly and pressing station 200A results in eliminating the need for hundreds of square feet of floor space, thousands of moving parts, multiple sensors and motors, and dozens of sub-assemblies and human operators of the prior art structure shown in as FIG. 1D and the stack production and processing section 199 of FIG. 1G, while still minimizing the amount of processing equipment that must be replaced.

According to the disclosed embodiments, multiple local robotic panel assembly and pressing stations, such as local robotic panel assembly and pressing station 200A, can be operated at once, and independently, to form a robotic panel assembly and pressing system 220.

Figure 2B:
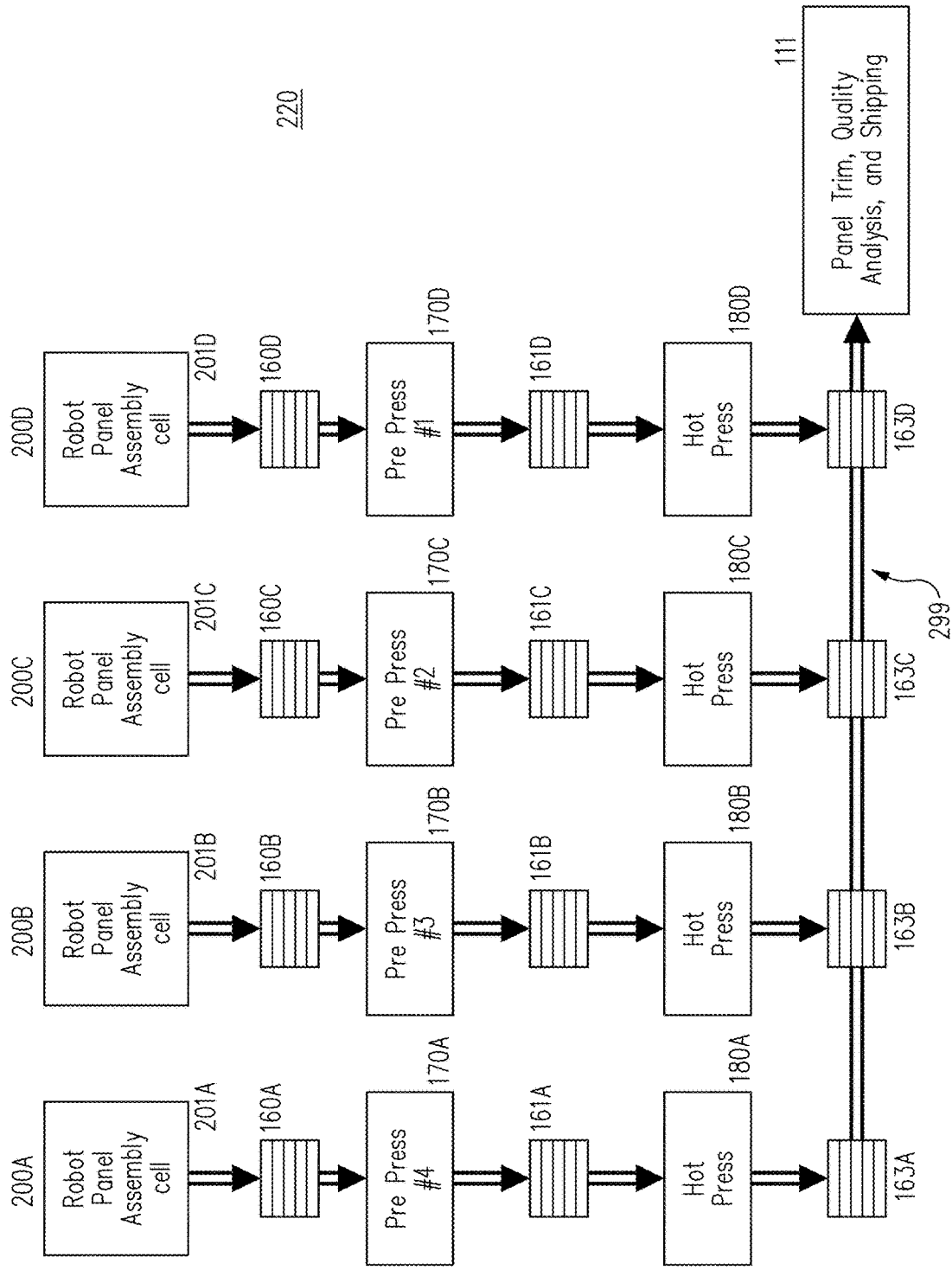
FIG. 2B is a diagram of a robotic panel assembly and pressing system including four local robotic panel assembly and pressing stations in accordance with one embodiment.

FIG. 2B is a diagram of a robotic panel assembly and pressing system 220 including four local robotic panel assembly and pressing stations 200A through 200D in accordance with one embodiment. In practice, the number of local robotic panel assembly and pressing stations can be fewer, or more, than the four shown in FIG. 2B.

As seen in FIG. 2B, each of local robotic panel assembly and pressing stations 200A, 200B, 200C, and 200D includes its own independently operating robot panel assembly cell 201A, 201B, 201C, and 201D, respectfully, that are used to independently create green panel stacks 160A, 160B, 160C, and 160D.

It is worth noting again that green panel stacks 160A, 160B, 160C, and 160D of FIG. 2B produced by local robot panel assembly cells 201A, 201B, 201C, and 201D are virtually identical to green panel stacks 160A, 160B, 160C, and 160D of FIG. 1G. Consequently, the set of local robot panel assembly cells 201A, 201B, 201C, and 201D literally replaces all of the prior art structure shown in as FIG. 1D and the stack production and processing section 199 of FIG. 1G, including traditional layered wood product panel assembly layup line 150 and stack press delivery line 162. This alone means that the set of local robotic panel assembly and pressing stations 200A, 200B, 200C, and 200D eliminates the need for hundreds of square feet of floor space, thousands of moving parts, multiple sensors and motors, and dozens of sub-assemblies and human operators.

As also seen in FIG. 2B, once local robot panel assembly cells 201A, 201B, 201C, and 201D create green panel stacks 160A, 160B, 160C, and 160D, green panel stacks 160A, 160B, 160C, and 160D are transferred to pre-presses 170A, 170B, 170C, and 170D, respectively, where the green panel stacks 160A, 160B, 160C, and 160D are subjected to cold pre-pressing. In the pre-presses 170A, 170B, 170C, and 170D, green panel stacks 160A, 160B, 160C, and 160D are pressed to flatten out the structures and force out any air pockets that may exist in the green panel stacks 160A, 160B, 160C, and 160D and to create pre-pressed stacks 161A, 161B, 161C, and 161D by the same pre-pressing process as discussed above.

Once pre-pressed stacks 161A, 161B, 161C, and 161D are created, pre-pressed stacks 161A, 161B, 161C, and 161D are conveyed into one or more unstacking mechanisms (not shown) which feed one layered wood structure panel at a time from the pre-pressed stacks 161A, 161B, 161C, and 161D into slots of one or more multi opening hot presses 180A, 180B. 180C, and 180D, respectively. At hot presses 180A, 180B, 180C, and 180D the layered wood structure panels making up pre-pressed stacks 161A, 161B, 161C, and 161D are subjected to further pressure and heat to further flatten and cure the layered wood structure panels making up pre-pressed stacks 161A, 161B, 161C, and 161D by the same hot pressing process as discussed above. Then the layered wood structure panels are re-stacked resulting in cured layered wood panel product stacks 163A, 163B, 163C, and 163D, respectively.

Cured layered wood panel product stacks 163A, 1634B, 163C, and 163D are then conveyed by conveyor 299 to panel trim, quality analysis, and shipping area 111 where the individual layered wood panels making up cured layered wood panel product stacks 163A, 1634B, 163C, and 163D are trimmed to size, subjected to quality control analysis, and then shipped to customers.

The pressing and trimming/quality control/shipping process shown in FIG. 2B is virtually identical to the pressing and finishing/quality control/shipping process discussed above with respect to FIG. 1G. Thus, according to one embodiment, once robot panel assembly cells 201A, 201B, 201C, and 201D create green panel stacks 160A, 160B, 160C, and 160D, green panel stacks 160A, 160B, 160C, and 160D are processed by local robotic panel assembly and pressing stations 200A through 200D in the same manner, and using the same equipment, as used to traditionally process layered wood products. Consequently, existing cold and hot press equipment need not be replaced. Therefore, the use of the disclosed robotic panel assembly and pressing system 220 results in eliminating the need for hundreds of square feet of floor space, thousands of moving parts, multiple sensors and motors, and dozens of sub-assemblies and human operators of the prior art structure shown in FIG. 1D and the stack production and processing section 199 of FIG. 1G, while still minimizing the amount of processing equipment that must be replaced.

In addition, robotic panel assembly and pressing system 220 has several other processing advantages over prior art systems. First, recall that using prior systems such as that shown in FIG. 1G, in addition to the cost of operating traditional layered wood product panel assembly layup and press line 151, including stack production and processing section 199, i.e., traditional layered wood product panel assembly layup line 150 and stack press delivery line 162, there was a significant cost associated with any delays in traditional layered wood product panel assembly layup and press line 151. These delays included delays due to failure of any of the thousands of moving parts associated with traditional layered wood product panel assembly layup and press line 151, and particularly stack production and processing section 199, or any human error introduced by the twelve or more people required to operate traditional layered wood product panel assembly layup and press line 151.

Further recall that, referring to FIGS. 1D and 1F together, when a delay occurred, for whatever reason, the layers of glue applied by glue applicators 109A through 109J could dry out before the green panel stacks 160 reached the pressing stations 153 through 159. This, in turn, resulted in layered wood product panels that could separate or otherwise fail because the glue could not cure and adhere the layers properly. Unfortunately, this resulted in significant loss of product using traditional layered wood product panel assembly layup and press line 151. Currently there is an average loss of product to defects of ten percent or more using traditional layered wood product panel assembly layup and press line 151.

However, referring back to FIG. 2B, in direct contrast to prior art systems, using independently operating robotic panel assembly and pressing system 220, the green panel stacks 160A, 160B, 160C, and 160D are independently built at individual static locations at, or near, the pressing area by individual and independently operating robot panel assembly cells 201A, 201B, 201C, and 201D. Consequently, using robotic panel assembly and pressing system 220 if there is a delay in any of the local robotic panel assembly and pressing stations 200A through 200D, the delay only affects the panels being processed by that particular local robotic panel assembly and pressing station, i.e., only one of pressing stations 200A through 200D. As a result, any such delay can, at most, cause a single stack of panels to be lost. This is in direct contrast to the multiple stacks that can be lost as a result of delays in traditional layered wood product panel assembly layup and press line 151. The product savings can literally be an order of magnitude or more as a delay in traditional layered wood product panel assembly layup and press line 151 can result in the loss of four hundred or more individual layered wood product panels while a delay in any of local robotic panel assembly and pressing stations 200A through 200D would typically result in, at most, forty individual layered wood product panels.

In addition, as noted above, using prior art methods and systems for producing layered wood products, such as using traditional layered wood product panel assembly layup and press line 151, material and glue systems are configured to run a single product at a time, i.e., only a single ply count panel, or single type of product (plywood or PLV), at a time. Changing products required stopping the machine, removing all in process material, and then reconfiguring controls for new product construction.

However, and again in direct contrast to prior art systems, using robotic panel assembly and pressing system 220, and local robotic panel assembly and pressing stations 200A through 200D, the green panel stacks 160A, 160B, 160C, and 160D are built independently at individual static locations at, or near, the pressing area by individual robot panel assembly cells 201A, 201B, 201C, and 201D. As a result, each of the local robotic panel assembly and pressing stations 200A through 200D can independently generate different products. Consequently, each of the local robotic panel assembly and pressing stations 200A through 200D can produce different ply count panels, or different types of products, plywood or PLV, independently and at the same time.

The fact that using robotic panel assembly, and pressing system 220, local robotic panel assembly and pressing stations 200A through 200D, green panel stacks 160A, 160B, 160C, and 160D are built at independently operating individual static locations at or near the pressing area by individual robot panel assembly cells 201A, 201B, 201C, and 201D eliminates the issues discussed above associated with prior art systems where it was critical to ensure coordination between the stacker operator SO and each of the press operators PO1, PO2, PO3, and PO4 of FIG. 1G so that the wrong size stacks were not loaded into a pre-press or hot press that is unable to process them.

Figure 2C:
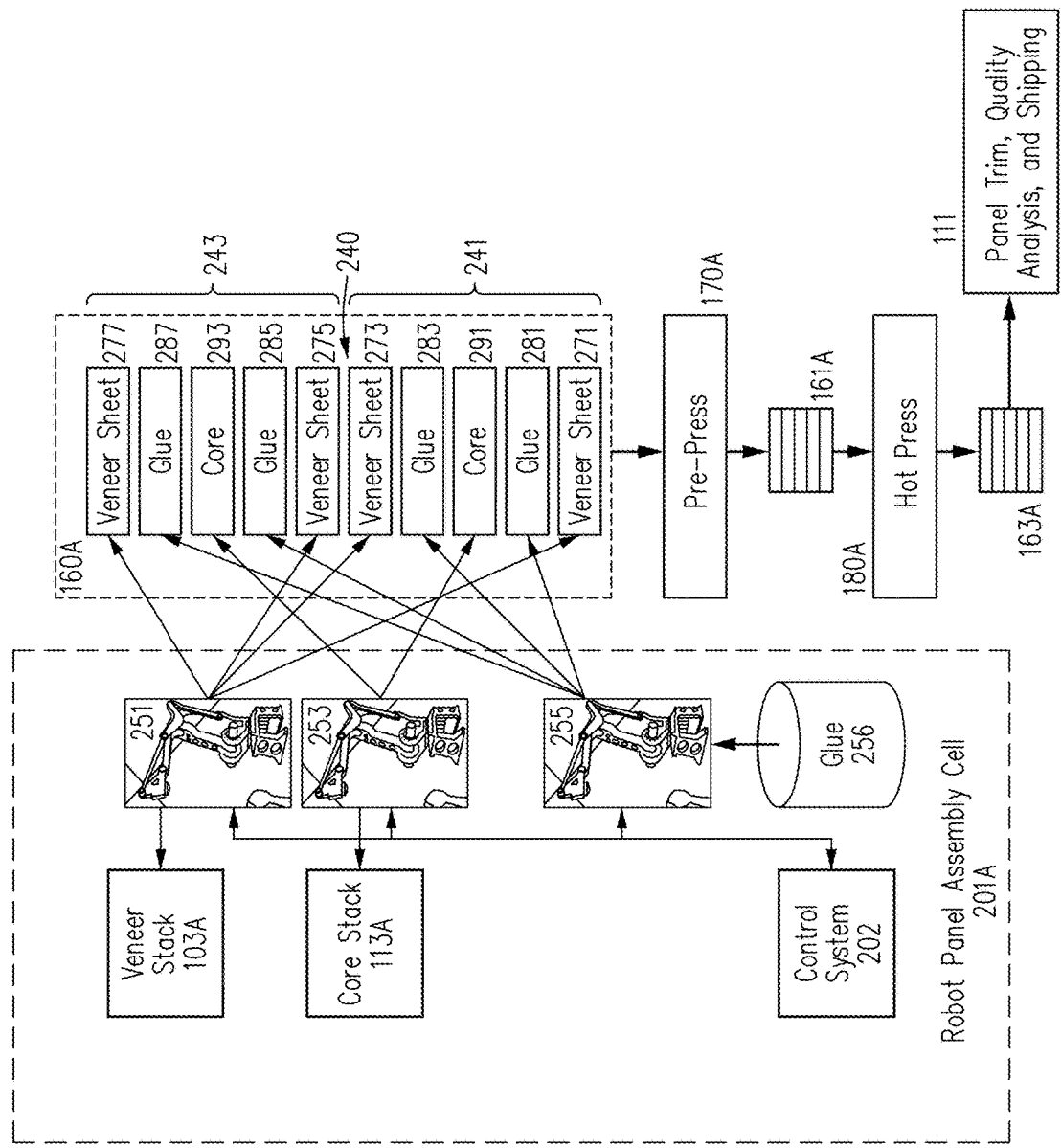
FIG. 2C is a diagram of a robotic panel assembly cell of FIGS. 2A and 2B in accordance with one embodiment.

FIG. 2C is a more detailed diagram of a robotic panel assembly cell 201A of FIGS. 2A and 2B in accordance with one embodiment.

Robotic panel assembly cell 201A is exemplary of any of the individual robot panel assembly cells 201A, 201B, 201C, and 201D of FIGS. 2A and 2B. As seen in FIG. 2C, robotic panel assembly cell 201A is used to create green panel stack 160A which is itself exemplary of any of the green panel stacks 160A, 160B, 160C, and 160D of FIGS. 2A and 2B.

As seen in FIG. 2C, robotic panel assembly cell 201A includes veneer handling robot 251 which is representative of one or more veneer handling robots; glue application robot 255 which is representative of one or more glue application robots; and, in some embodiments where plywood green layered wood product panel stacks are to be produced, core handling robot 253 which is representative of one or more core handling robots.

Also seen in FIG. 2C is control system 202 which is used to control veneer handling robot 251, core handling robot 253, and glue application robot 255. In various embodiments, control system 202 is representative of one or more computing systems which generate instructions for veneer handling robot 251, core handling robot 253, and glue application robot 255 in the form of control signals. In this way, control system 202 directs veneer handling robot 251, core handling robot 253, and glue application robot 255 in the construction of the green panel stack 160A via the generated control signals.

In one embodiment, veneer handling robot 251 is directed by the control signals from control system 202 to retrieve veneer sheets from veneer stack 103A and place the veneer sheets on green plywood panel stack 160A in accordance with received control signals to create the green layered wood product panels 241 and 243 in green panel stack 160A as discussed above and as shown in FIG. 2C.

In one embodiment, glue application robot 255 is directed by the control signals from control system 202 to apply a layer of glue from glue reservoir 256 between sheets of veneer and/or core material in accordance with received control signals to create the green layered wood product panels 241 and 243 in green panel stack 160A as discussed above and as shown in FIG. 2C.

In embodiments where robotic panel assembly cell 201A is used to create green plywood panels 241 and a green plywood panel stack 160A, robotic panel assembly cell 201A includes core handling robot 253. In one embodiment, core handling robot 253 is directed by the control signals from control system 202 to retrieve core material from core stack 113A and place a portion of core material on green plywood panel stack 160A in accordance with received control signals to create the green plywood panels 241 and 243 in green plywood panel stack 160A as discussed above and as shown in FIG. 2C.

Robots, such as veneer handling robot 251, glue application robot 255, and core handling robot 253 are generally known in the art, at least generically as systems for handling materials and performing various tasks in response to control signals from one or more control systems. Consequently, a detailed description of the general structure and operation of robots is omitted here to avoid detracting from the invention. However, the tasks performed by veneer handling robot 251, glue application robot 255, and core handling robot 253 and the use of veneer handling robot 251, glue application robot 255, and core handling robot 253 to produce green layered wood panel stacks, such as green panel stack 160A are not known in the art and therefore the functions performed by veneer handling robot 251, glue application robot 255, and core handling robot 253 are described in detail.

In particular, as shown in FIG. 2C, veneer handling robot 251 is first directed by control signals from control system 202 to retrieve veneer sheet 271 from the stack of veneer sheets 103A and place the veneer sheet 271 on green panel stack 160A.

Then glue application robot 255 is directed by the control signals from control system 202 to apply a layer of glue 281 from glue reservoir 256 to veneer sheet 271.

In embodiments where robotic panel assembly cell 201A is used to create green plywood panels, then core handling robot 253 is directed by the control signals from control system 202 to retrieve core material from core stack 113A and place a portion of core material on green panel stack 160A to create core layer 291.

Glue application robot 255 is then directed by the control signals from control system 202 to apply a layer of glue 283 from glue reservoir 256 on core layer 291. Then veneer handling robot 251 is directed by control signals from control system 202 to retrieve veneer sheet 273 from the stack of veneer sheets 103A and place the veneer sheet 273 on green layered wood product panel 160A.

Of note, in embodiments where robotic panel assembly cell 201A is used to produce green layered wood product stacks of other types of layered wood products, such as green PLV panels, core handling robot 253 is either deactivated or not present. In these cases, veneer handling robot 251 is directed by control signals from control system 202 to retrieve veneer sheet 271 from the stack of veneer sheets 103A and place the veneer sheet 271 on green panel stack 160A. Then glue application robot 255 is directed by the control signals from control system 202 to apply a layer of glue 281 from glue reservoir 256 to veneer sheet 271. Then veneer handling robot 251 is simply directed by control signals from control system 202 to retrieve another veneer sheet 273 from the stack of veneer sheets 103A and place the veneer sheet 273 on veneer sheet 271.

The result of the operations above is a three-ply green layered wood product panel 241. As noted above, plywood, and other layered wood product panels often have twenty-one or more plys. However, for simplicity of illustration, green layered wood product panel 241 is a three-ply green layered wood product panel 241.

Once green layered wood product panel 241 is constructed by robotic panel assembly cell 201A, robotic panel assembly cell 201A begins to construct a second green layered wood product panel 243 of green panel stack 160A. To this end, veneer handling robot 251 is again directed by control signals from control system 202 to retrieve a veneer sheet 275 from the stack of veneer sheets 103A and place the veneer sheet 275 on the glue-free side of veneer sheet 273. Importantly, veneer handling robot 251 is directed by control signals from control system 202 to retrieve veneer sheet 275 from the stack of veneer sheets 103A and place the veneer sheet 275 on the veneer sheet 273 directly, without any glue layer being applied by glue application robot 255. This creates a dry veneer to veneer layer, or gap 240. Gap 240 therefore separates green layered wood product panel 241 and green layered wood product panel 243 in green panel stack 160A.

Then glue application robot 255 is directed by the control signals from control system 202 to apply a layer of glue 285 from glue reservoir 256 to veneer sheet 275. In embodiments where robotic panel assembly cell 201A is used to create green plywood panels, then core handling robot 253 is directed by the control signals from control system 202 to retrieve core material from core stack 113A and place a portion of core material on green panel stack 160A to create core layer 293. Then glue application robot 255 is directed by the control signals from control system 202 to apply a layer of glue 287 from glue reservoir 256 on core layer 293 Then veneer handling robot 251 is directed by control signals from control system 202 to retrieve veneer sheet 277 from the stack of veneer sheets 103A and place the veneer sheet 277 on green panel stack 160A.

Of note again, in embodiments where robotic panel assembly cell 201A is used to produce green layered wood product stacks of other types of layered wood products, such as green PLV panels, core handling robot 253 is either deactivated or not present. In these cases, veneer handling robot 251 is directed by control signals from control system 202 to retrieve veneer sheet 275 from the stack of veneer sheets 103A and place the veneer sheet 275 on green panel stack 160A. Then glue application robot 255 is directed by the control signals from control system 202 to apply a layer of glue 285 from glue reservoir 256 to veneer sheet 275. Then veneer handling robot 251 is simply directed by control signals from control system 202 to retrieve another veneer sheet 277 from the stack of veneer sheets 103A and place the veneer sheet 277 on veneer sheet 275.

The result of the operations above is a second three-ply green layered wood product panel 243. The process above is then repeated to create the desired number of green layered wood product panels for green panel stack 160A. As noted above, it is not uncommon for green panel stack 160A to include forty or more individual green layered wood product panels.

It is worth noting again that green panel stack 160A of FIG. 2C produced by robot panel assembly cell 201A is virtually identical to green panel stack 160A of FIG. 1G, or any of the green panel stacks 160 of FIGS. 1D or FIG. 1G. Consequently, robot panel assembly cell 201A literally replaces all of the prior art structure shown in FIG. 1D and the stack production and processing section 199 of FIG. 1G, including traditional layered wood product panel assembly layup line 150 and stack press delivery line 162. This alone means that local robotic panel assembly and pressing station 200A eliminates the need for hundreds of square feet of floor space, thousands of moving parts, multiple sensors and motors, and dozens of sub-assemblies and human operators.

In addition, according to the disclosed embodiments, and in contrast to prior art systems, robot panel assembly cell 201A is located locally at, or near, pre-press 170A and hot press 180A. Therefore, green panel stack 160A is assembled by robot panel assembly cell 201A locally with respect to the pressing line. Consequently, robot panel assembly cell 201A assembles the same green panel stack 160A as any of the green panel stacks 160 of FIGS. 1D or FIG. 1G locally with respect to pre-press 170A and hot press 180A and at a single location.

As seen in FIG. 2A, once robot panel assembly cell 201A creates green panel stack 160A, green panel stack 160A is transferred to pre-press 170A and green panel stack 160A is loaded into pre-press 170A where the green panel stack 160A is subjected to cold pre-pressing. In the pre-press 170A green panel stack 160A is pressed to flatten out the structure and force out any air pockets that may exist in the green panel stack 160A and to create pre-pressed stack 161A.

Once pre-pressed stack 161A is created, pre-pressed stack 161A is conveyed to an unstacking mechanism (not shown) which feeds the layered wood structure panels making up pre-pressed stack 161A one at a time into slots of hot press 180A. At hot press 180A the layered wood structure panels making up pre-pressed stack 161A are subjected to further pressure and heat to further flatten and cure the layered wood structure panels making up pre-pressed stack 161A. The layered wood structure panels are then re-stacked to form cured layered wood panel product stack 163A.

Cured layered wood panel product stack 163A is then conveyed to panel trim, quality analysis, and shipping area 111 where the individual layered wood panels making up cured layered wood panel product stack 163A are trimmed to size, subjected to quality control analysis, and then shipped to customers.

In one embodiment, the pressing and trimming/quality control/shipping process shown in FIG. 2A is virtually identical to the pressing and finishing/quality control/shipping process discussed above with respect to FIG. 1G. Thus, according to one embodiment, once robot panel assembly cell 201A creates green panel stack 160A, green panel stack 160A is processed in the same manner, and using the same equipment, as is used to traditionally process layered wood products. Consequently, existing cold and hot press equipment need not be replaced. Therefore, the use of the disclosed local robotic panel assembly and pressing station 200A results in eliminating the need for hundreds of square feet of floor space, thousands of moving parts, multiple sensors and motors, and dozens of sub-assemblies and human operators of the prior art structure shown in as FIG. 1D and the stack production and processing section 199 of FIG. 1G, while still minimizing the amount of processing equipment that must be replaced.

As discussed briefly above, the same layering of veneer that potentially provides so many advantages in layered wood products can also present some drawbacks. For instance, the presence of irregular surfaces in the layered sheets of veneer, i.e., inconsistent surface texture and moisture content, can create problems, such as cracks or other defects, in the layered wood products. This, of course, can result in compromised structural integrity of the layered wood products and/or undesirable imperfections in the layered wood products. Consequently, it is critical to accurately and efficiently determine the surface texture and moisture content of the veneer sheets used in a layered wood products. However, accurately, effectively, and efficiently determining the surface texture and moisture content of the veneer sheets used in layered wood products has historically been a difficult technical problem to solve.

Consequently, prior art methods and systems for producing layered wood products typically do not include any process for inspecting or grading veneer sheets used in the production of layered wood products. As a result, using prior art methods and systems for producing layered wood products, the quality of veneer fed into process was not inspected during feeding operation. Therefore, undetected defects often caused panels to be rejected only downstream after significant time and energy had already been devoted to the panels, i.e., pressing is complete and panel quality is analyzed.

Several recently discovered technical solutions to the technical problem of accurately and efficiently determining the surface texture and moisture content of the veneer sheets used in a layered wood products are set forth in the related U.S. Patent Applications incorporated by reference above. Using these disclosed quality inspection methods and systems, the surface texture and moisture of veneer sheets used in layered wood products can be determined before the veneer is processed.

In one embodiment, the disclosed method and system for producing layered wood products takes advantage of these innovations to inspect and grade the veneer sheets used in the disclosed method and system for producing layered wood products. To this end, in one embodiment, the disclosed local robotic panel assembly and pressing stations include a veneer inspection/grading robot and an inspection/grading system which is used to determine the quality of veneer fed into process during feeding operation. Therefore, defects can be detected, and the veneer sheets can be graded before significant time and energy has already been devoted to the panels.

Figure 2D:
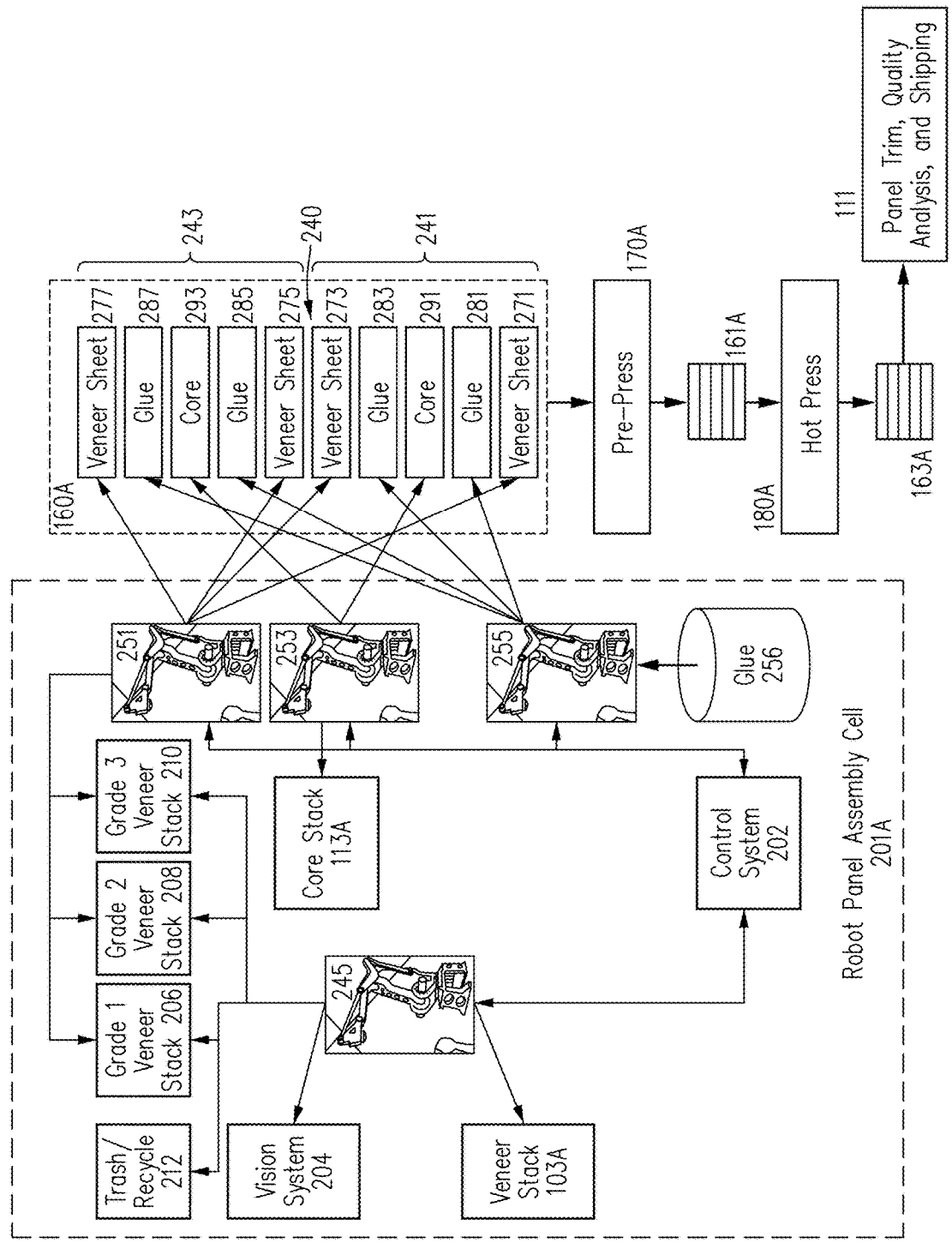
FIG. 2D is a diagram of a local robot panel assembly cell of FIGS. 2A and 2B including a veneer inspection and grading system in accordance with one embodiment.

FIG. 2D is a diagram of a local robot panel assembly cell 211A that is similar to robot panel assembly cell 201A of FIGS. 2A, 2B, and 2C but that includes a veneer inspection and grading system 204 and multiple graded veneer stacks 206, 208, 210 and 212 in accordance with one embodiment.

The operation of local robot panel assembly cell 211A is substantially similar to the operation of robot panel assembly cell 201A of FIGS. 2A, 2B, and 2C. However, before veneer sheets from veneer stack 103A are made available to veneer handling robot 251 the veneer sheets are retrieved by veneer inspection/grading robot 245 which is representative of one or more veneer inspection/grading robots. Veneer inspection/grading robot 245 then presents each veneer sheet to the veneer inspection/grading system 204 in accordance with control signals from control system 202.

At the veneer inspection/grading system 204 the veneer sheets are inspected and assigned a grade based on the inspection results. Veneer inspection/grading system 204 can utilize one or more inspection methods and systems such as any of those set forth in the related U.S. Patent Applications incorporated by reference above. For example, Veneer inspection/grading system 204 can utilize one of more visible light inspection systems and/or one or more Near Infrared (NIR) inspection systems and/or superimposed imaging to detect surface irregularities, moisture levels, density, and to assign a grade to the veneer sheets of veneer stack 103A.

In one embodiment, based on the grade assigned to each veneer sheet, each veneer sheet is placed in one of graded veneer stacks, such as graded veneer stacks 206, 208, 210 and 212 of FIG. 2D by veneer inspection/grading robot 245. In one embodiment, veneer stack 206 is a grade 1 veneer stack that includes veneer sheets that are deemed to be of acceptable appearance and quality to be used for outer veneer layers of a layered wood panel. In one embodiment, veneer stack 208 is a grade 2 veneer stack that includes veneer sheets that are deemed to be of acceptable structural quality to be used for inner veneer layers of a layered wood panel but perhaps lack the appearance to be used as outer layers of a layered wood panel. In one embodiment, veneer stack 210 is a grade 3 veneer stack that includes veneer sheets that are deemed to have structural anomalies, such as knot holes, and therefore must be sparingly used for inner veneer layers of a layered wood panel and perhaps must be sandwiched between higher grade veneer sheets to provide adequate structural quality for the layered wood panel. Finally, in one embodiment, trash 212 contains veneer sheets of unacceptable quality.

By grading veneer sheets from veneer stack 103A and stacking the veneer sheets according to grade, the quality of veneer fed into process during feeding operation is determined before resources are expended processing the veneer, i.e., defects can be detected in the veneer sheets, and the veneer sheets can be graded, and allocated for their best use, before significant time and energy is devoted to their use in processed panels.

Once the veneer sheets from veneer stack 103A are inspected/graded by inspection grading system 204, and the sheets are placed in appropriate graded veneer stacks 206, 208, 210 and 212 by veneer inspection/grading robot 245, robot panel assembly cell 211A operates the same way as robot panel assembly cell 201A of FIGS. 2A, 2B, and 2C.

In particular, as shown in FIG. 2D, veneer handling robot 251 is directed by control signals from control system 202 to retrieve veneer sheet 271 from the appropriate graded veneer stack 206, 208, 210 and place the veneer sheet 271 on green panel stack 160A.

Then glue application robot 255 is directed by the control signals from control system 202 to apply a layer of glue 281 from glue reservoir 256 to veneer sheet 271.

In embodiments where robotic panel assembly cell 211A is used to create green plywood panels, then core handling robot 253 is directed by the control signals from control system 202 to retrieve core material from core stack 113A and place a portion of core material on green panel stack 160A to create core layer 291.

Glue application robot 255 is then directed by the control signals from control system 202 to apply a layer of glue 283 from glue reservoir 256 on core layer 291. Then veneer handling robot 251 is directed by control signals from control system 202 to retrieve veneer sheet 273 from the appropriate graded veneer stack 206, 208, 210 and place the veneer sheet 273 on green layered wood product panel 160A.

Of note, in embodiments where robotic panel assembly cell 211A is used to produce green layered wood product stacks of other types of layered wood products, such as green PLV panels, core handling robot 253 is either deactivated or not present. In these cases, veneer handling robot 251 is directed by control signals from control system 202 to retrieve veneer sheet 271 from the appropriate graded veneer stack 206, 208, 210 and place the veneer sheet 271 on green panel stack 160A. Then glue application robot 255 is directed by the control signals from control system 202 to apply a layer of glue 281 from glue reservoir 256 to veneer sheet 271. Then veneer handling robot 251 is simply directed by control signals from control system 202 to retrieve another veneer sheet 273 from the appropriate graded veneer stack 206, 208, 210 and place the veneer sheet 273 on veneer sheet 271.

The result of the operations above is a single three-ply green layered wood product panel 241. As noted above, plywood, and other layered wood product panels often have twenty-one or more plys. However, for simplicity of illustration, green layered wood product panel 241 is a single three-ply green layered wood product panel 241.

Once green layered wood product panel 241 is constructed by robotic panel assembly cell 211A, robotic panel assembly cell 211A begins to construct a second green layered wood product panel 243 of green panel stack 160A. To this end, veneer handling robot 251 is again directed by control signals from control system 202 to retrieve veneer sheet 275 from the appropriate graded veneer stack 206, 208, 210 and place the veneer sheet 275 on the glue-free side of veneer sheet 273. Importantly, veneer handling robot 251 is directed by control signals from control system 202 to retrieve veneer sheet 275 from the appropriate graded veneer stack 206, 208, 210 and place the veneer sheet 275 on the veneer sheet 273 directly, without any glue layer being applied by glue application robot 255. This creates a dry veneer to veneer layer, or gap 240. Gap 240 therefore separates green layered wood product panel 241 and green layered wood product panel 243 in green panel stack 160A.

Then glue application robot 255 is directed by the control signals from control system 202 to apply a layer of glue 285 from glue reservoir 256 to veneer sheet 275. In embodiments where robotic panel assembly cell 211A is used to create green plywood panels, then core handling robot 253 is directed by the control signals from control system 202 to retrieve core material from core stack 113A and place a portion of core material on green panel stack 160A to create core layer 293. Then glue application robot 255 is directed by the control signals from control system 202 to apply a layer of glue 287 from glue reservoir 256 on core layer 293. Then veneer handling robot 251 is directed by control signals from control system 202 to retrieve veneer sheet 277 from the appropriate graded veneer stack 206, 208, 210 and place the veneer sheet 277 on green panel stack 160A.

Of note again, in embodiments where robotic panel assembly cell 211A is used to produce green layered wood product stacks of other types of layered wood products, such as green PLV panels, core handling robot 253 is either deactivated or not present. In these cases, veneer handling robot 251 is directed by control signals from control system 202 to retrieve veneer sheet 275 from the appropriate graded veneer stack 206, 208, 210 and place the veneer sheet 275 on green panel stack 160A. Then glue application robot 255 is directed by the control signals from control system 202 to apply a layer of glue 285 from glue reservoir 256 to veneer sheet 275. Then veneer handling robot 251 is simply directed by control signals from control system 202 to retrieve another veneer sheet 277 from the appropriate graded veneer stack 206, 208, 210 and place the veneer sheet 277 on veneer sheet 275.

The result of the operations above is a second single three-ply green layered wood product panel 243. The process above is then repeated to create the desired number of green layered wood product panel for green panel stack 160A. As noted above, it is not uncommon for green panel stack 160A to include forty or more individual green layered wood product panels.

It is worth noting again that green panel stack 160A of FIG. 2D produced by robot panel assembly cell 211A is virtually identical to green panel stack 160A of FIG. 1G, or any of the green panel stacks 160 of FIG. 1D or FIG. 1G. Consequently, robot panel assembly cell 211A literally replaces all of the prior art structure shown in as FIG. 1D and the stack production and processing section 199 of FIG. 1G, including traditional layered wood product panel assembly layup line 150 and stack press delivery line 162. This alone means that local robotic panel assembly and pressing station 200A eliminates the need for hundreds of square feet of floor space, thousands of moving parts, multiple sensors and motors, and dozens of sub-assemblies and human operators.

In addition, according to the disclosed embodiments, and in contrast to prior art systems, robot panel assembly cell 211A is located locally at, or near, pre-press 170A and hot press 180A. Therefore, green panel stack 160A is assembled by robot panel assembly cell 211A locally with respect to the pressing line. Consequently, robot panel assembly cell 211A assembles the same green panel stack 160A as any of the green panel stacks 160 of FIGS. 1D or FIG. 1G locally with respect to pre-press 170A and hot press 180A and at a single location.

As seen in FIG. 2D, once robot panel assembly cell 211A creates green panel stack 160A, green panel stack 160A is transferred to pre-press 170A and green panel stack 160A is loaded into pre-press 170A where the green panel stack 160A is subjected to pre-pressing by the methods discussed above. In the cold press 170A green panel stack 160A is pressed to flatten out the structure and force out any air pockets that may exist in the green panel stack 160A and to create pre-pressed stack 161A.

Once pre-pressed stack 161A is created, pre-pressed stack 161A is conveyed to an unstacking mechanism (not shown) which feeds the layered wood structure panels making up pre-pressed stack 161A one at a time into slots of hot press 180A. At hot press 180A the layered wood structure panels making up pre-pressed stack 161A are subjected to further pressure and heat to further flatten and cure the layered wood structure panels making up pre-pressed stack 161A by the methods discussed above. The layered wood structure panels are then re-stacked to form cured layered wood panel product stack 163A.

Cured layered wood panel product stack 163A is then conveyed to panel trim, quality analysis, and shipping area 111 where the individual layered wood panels making up cured layered wood panel product stack 163A are trimmed to size, subjected to quality control analysis, and then shipped to customers.

The pressing and trimming/quality control/shipping process shown in FIG. 2D is virtually identical to the pressing and finishing/quality control/shipping process discussed above with respect to FIG. 1G. Thus, according to one embodiment, once robot panel assembly cell 211A creates green panel stack 160A, green panel stack 160A is processed in the same manner, and using the same equipment, as is used to traditionally process layered wood products. Consequently, existing cold and hot press equipment need not be replaced. Therefore, the use of the disclosed local robotic panel assembly and pressing station 200A results in eliminating the need for hundreds of square feet of floor space, thousands of moving parts, multiple sensors and motors, and dozens of sub-assemblies and human operators of the prior art structure shown in as FIG. 1D and the stack production and processing section 199 of FIG. 1G, while still minimizing the amount of processing equipment that must be replaced.

Figure 3:
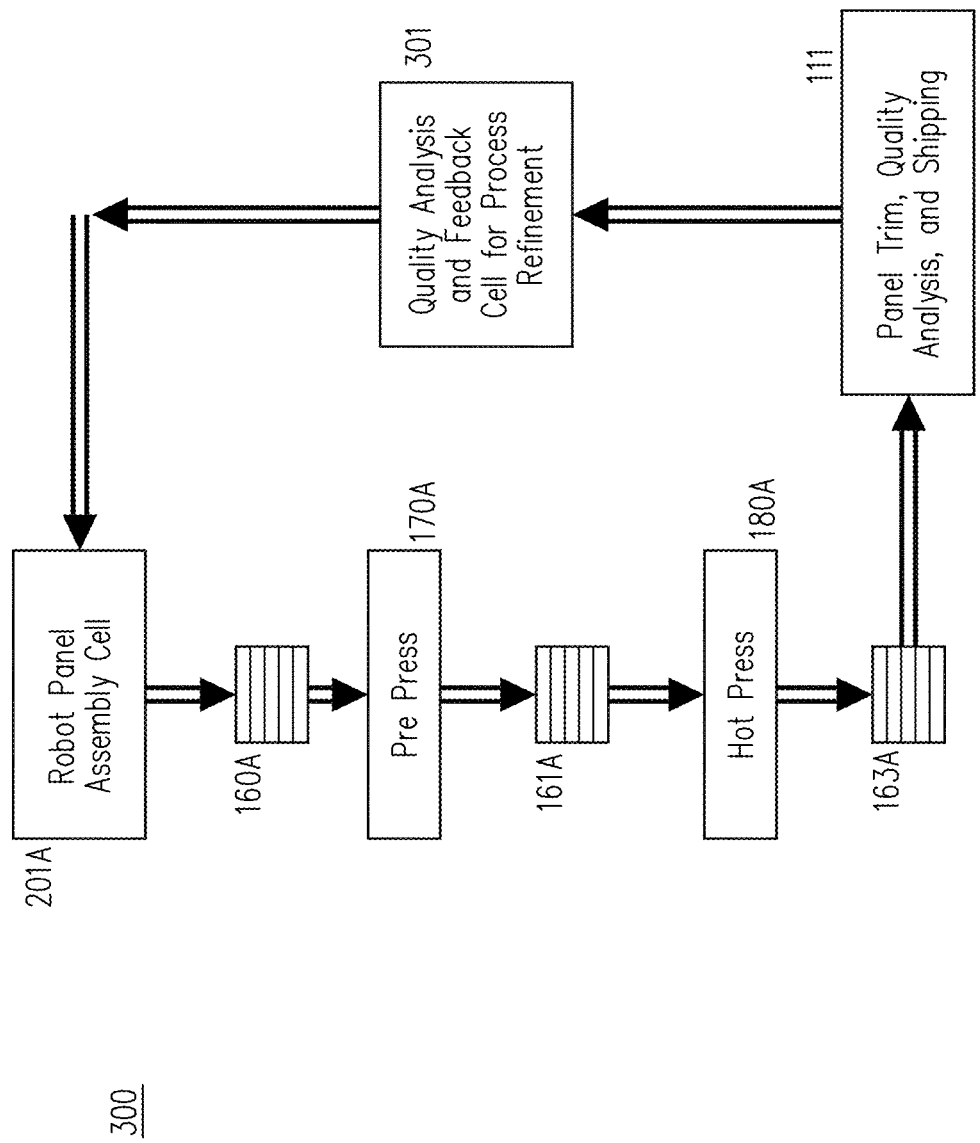
FIG. 3 is a diagram of a local robotic panel assembly and pressing station including a quality analysis and feedback cell for process refinement in accordance with one embodiment.

In some embodiments, a quality analysis and feedback cell for process refinement is included in a local robot panel assembly cell. FIG. 3 is a diagram of a local robotic panel assembly and pressing station 300 including a quality analysis and feedback cell 301 for process refinement in accordance with one embodiment.

As seen in FIG. 3, once local robot panel assembly cell 201A creates green panel stack 160A, green panel stack 160A is transferred to pre-press 170A and green panel stack 160A is loaded into pre-press 170A where the green panel stack 160A is subjected to cold pre-pressing. In the pre-press 170A green panel stack 160A is pressed to flatten out the structure and force our any air pockets that may exist in the green panel stack 160A and to create pre-pressed stack 161A by the methods discussed above.

Once pre-pressed stack 161A is created, pre-pressed stack 161A is conveyed to an unstacking mechanism (not shown) which feeds the layered wood structure panels making up pre-pressed stack 161A one at a time into slots of hot press 180A. At hot press 180A the layered wood structure panels making up pre-pressed stack 161A are subjected to further pressure and heat to further flatten and cure the layered wood structure panels making up pre-pressed stack 161A by the methods discussed above. The layered wood structure panels are then re-stacked to form cured layered wood panel product stack 163A.

Cured layered wood panel product stack 163A is then conveyed to panel trim, quality analysis, and shipping area 111 where the individual layered wood panels making up cured layered wood panel product stack 163A are trimmed to size, subjected to quality control analysis, and then shipped to customers.

Figure 4A:
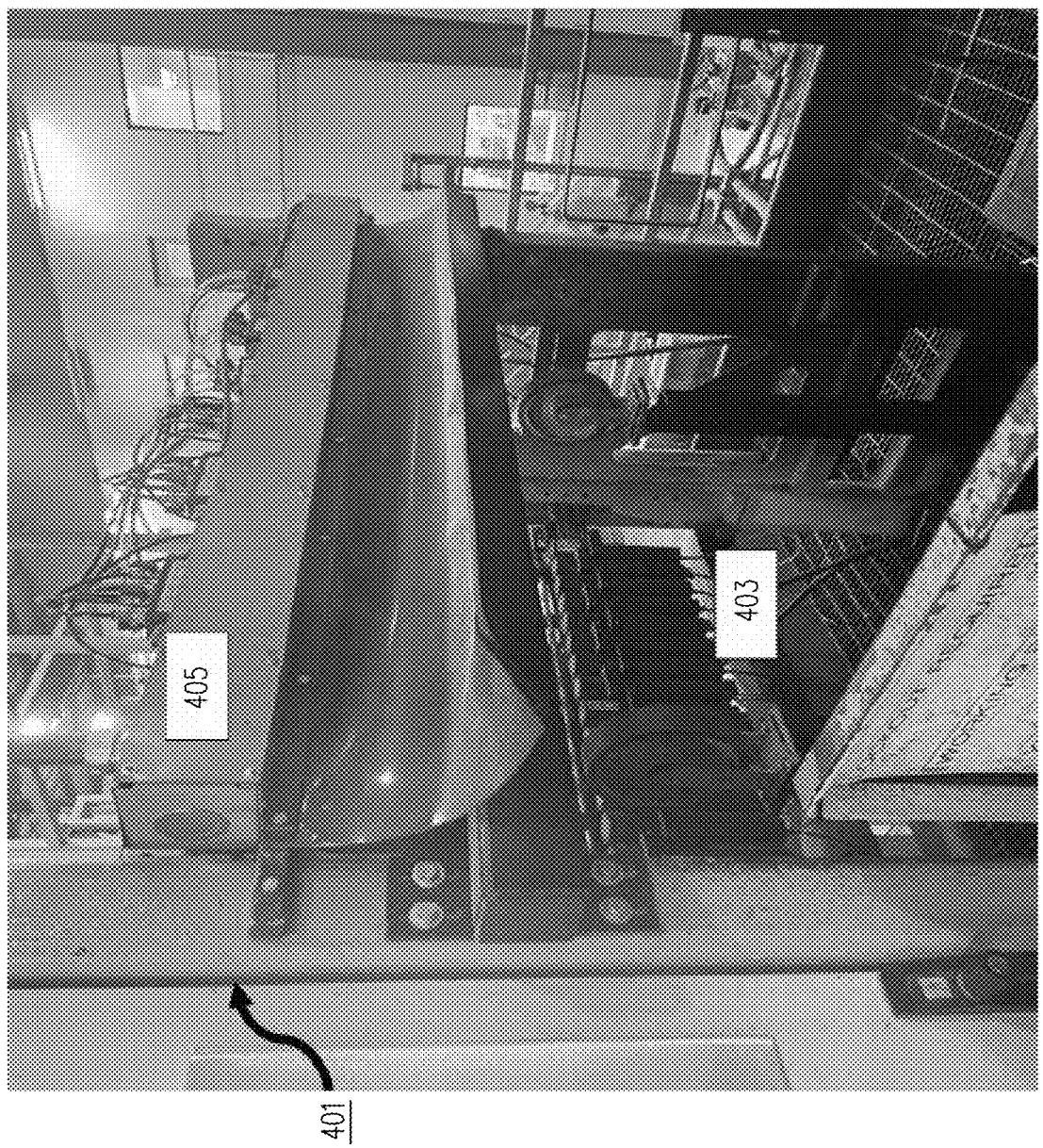
FIG. 4A is a photograph of one type of wood product panel bond analyzer used in accordance with one embodiment.

FIG. 4A is a photograph of one type of wood product panel bond analyzer 401 used in accordance with one embodiment. In one embodiment, wood product panel bond analyzer 401 is included as part of panel trim, quality analysis, and shipping area 111.

As seen in FIG. 4A, in one embodiment, wood product panel bond analyzer 401 includes an array of ultrasonic transmitter/receiver pairs 403 and 405 (not visible in FIG. 4A) that send a pulse through the wood panel product. The amplitude of the signal passed through the wood by transmitters 403 and received by receivers 405, and the time delay between the transmissions from transmitters 403 to the receipt of those transmissions by receivers 405 are recorded and these parameters are utilized to calculate the quality of bond of the wood panel.

Figure 4B:
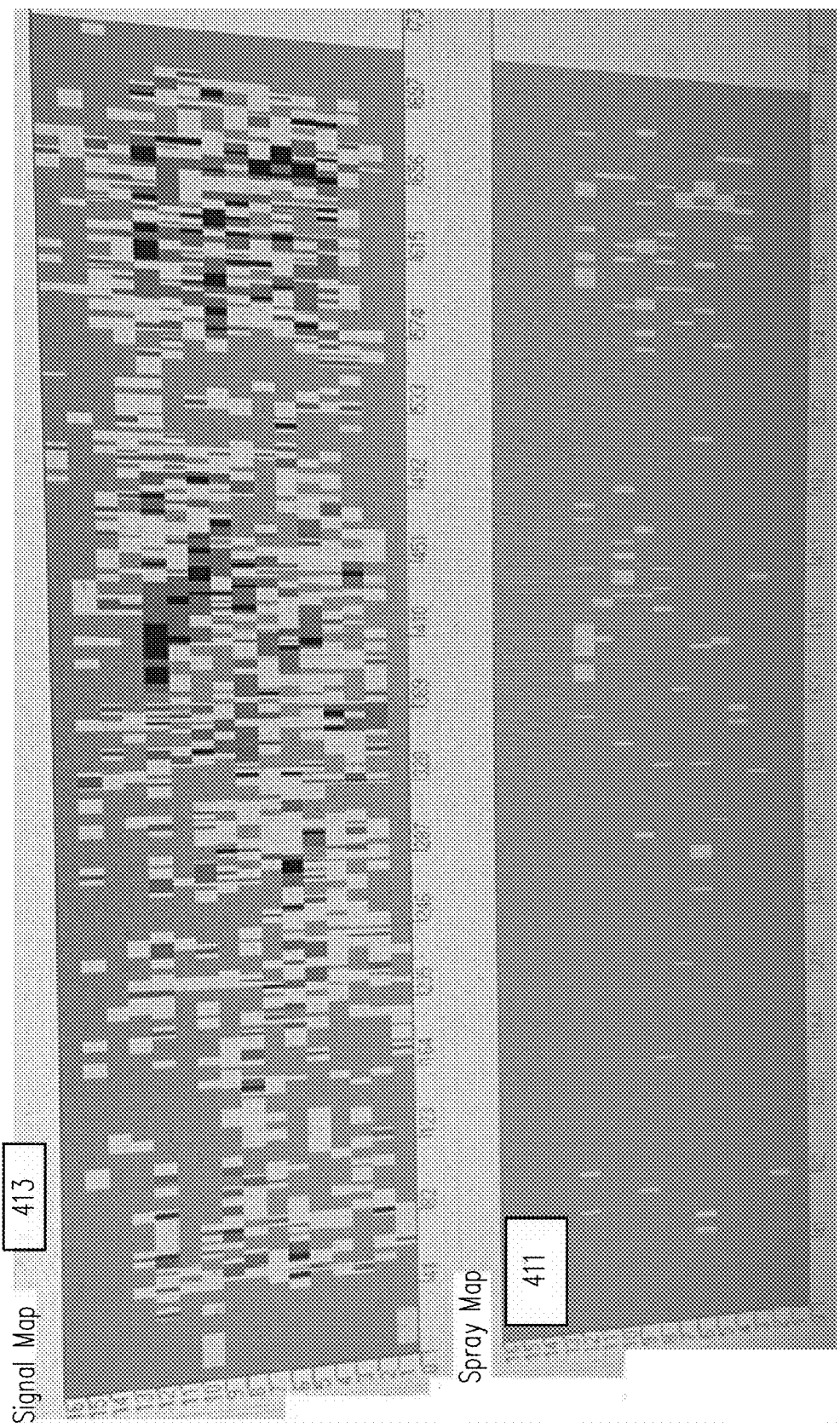
FIG. 4B is a photograph of a structural density analysis report based on the results of processing using one type of wood product panel bond analyzer used in accordance with one embodiment.

FIG. 4B is a photograph of a structural density analysis report 411 based on the results of processing using one type of wood product panel bond analyzer used in accordance with one embodiment.

As seen in FIG. 4B, in one embodiment, the wood panel exits the press and typically passes through the wood product panel bond analyzer 401 of FIG. 4A. Typically wood product panel bond analyzer 401 is configured to analyze and record the reading for each 3"×3" square of the panel as it passes the ultrasonic heads. This size can be configured per customer requirements, with 3" being common in wood products panel manufacturing. For each panel analyzed, the grader prepares a data file and represents it in a visual format. The top image 413 is typically gray scale and the lower image 411 being colorized. The customer can define the values required for quality and alert if those thresholds are not met. Numerous combinations of quality and number of adjacent squares can be considered per customer requirements.

Figure 4D:
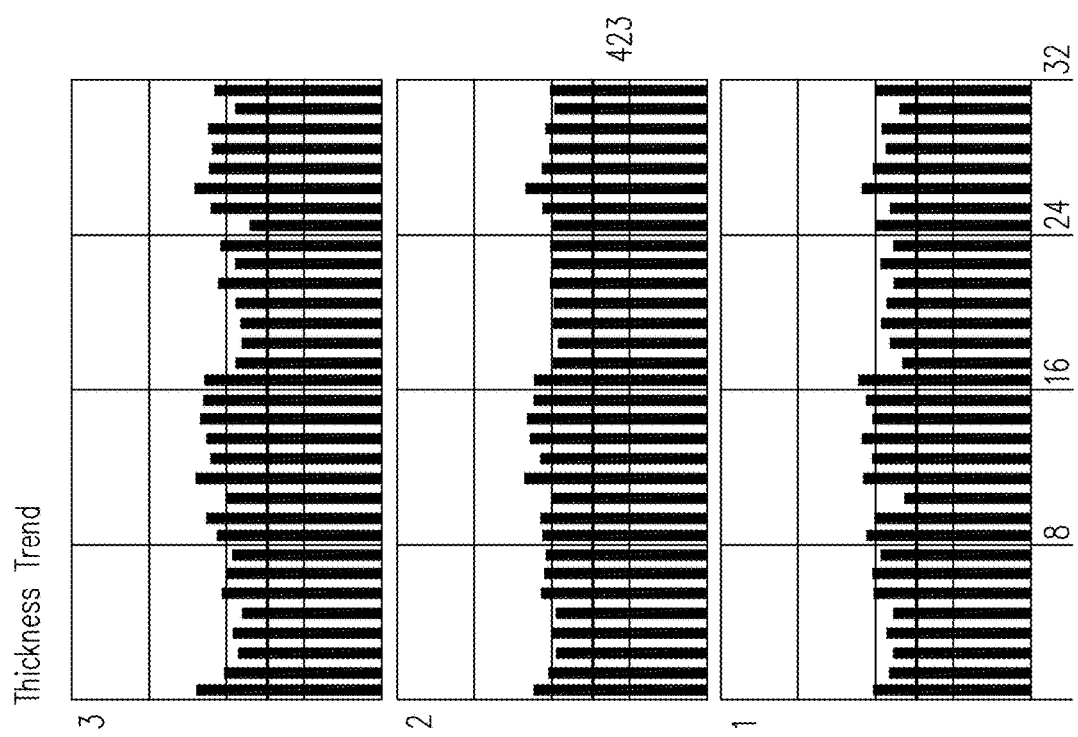
FIG. 4D is a photograph of panel thickness trend analysis report based on the results of processing using one type of wood product panel bond analyzer used in accordance with one embodiment.
Figure 4C:
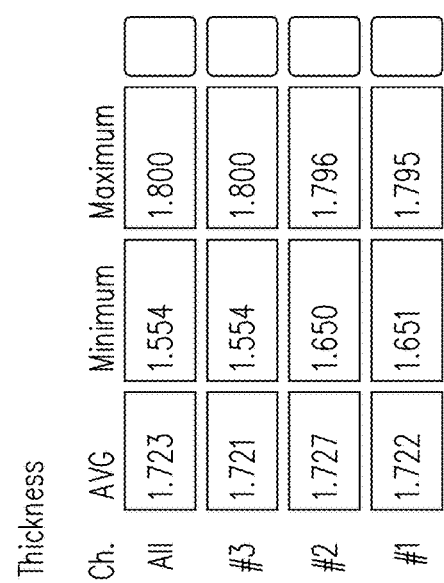
FIG. 4C is a photograph of average panel thickness analysis report based on the results of processing using one type of wood product panel bond analyzer used in accordance with one embodiment.

FIG. 4C is a photograph of average panel thickness analysis report 421 based on the results of processing using one type of wood product panel bond analyzer used in accordance with one embodiment.

FIG. 4D is a photograph of panel thickness trend analysis report 423 based on the results of processing using one type of wood product panel bond analyzer used in accordance with one embodiment.

Referring to FIGS. 4C and 4D together, typically each panel is also measured for thickness. Alert points can be configured as to allow alerting when thresholds are exceeded. Panel thickness is often controlled by press pressure and/or press to position instrumentation allowing the press to compress the panel the required amount to produce a completed panel withing selected tolerances.

The pressing and trimming/quality control/shipping process shown in FIG. 3 is virtually identical to the pressing and finishing/quality control/shipping process discussed above with respect to FIG. 1G. Thus, according to one embodiment, once robot panel assembly cell 201A creates green panel stack 160A, green panel stack 160A is processed in the same manner, and using the same equipment, as is used to traditionally process layered wood products. Consequently, existing cold and hot press equipment need not be replaced. Therefore, the use of the disclosed local robotic panel assembly and pressing station 200A results in eliminating the need for hundreds of square feet of floor space, thousands of moving parts, multiple sensors and motors, and dozens of sub-assemblies and human operators of the prior art structure shown in as FIG. 1D and the stack production and processing section 199 of FIG. 1G, while still minimizing the amount of processing equipment that must be replaced.

Referring to FIGS. 2C and 3 together, when the individual layered wood panels making up cured layered wood panel product stack 163A are subjected to quality control analysis at panel trim, quality analysis, and shipping area 111, quality parameter data, such as, but not limited to, the data discussed above with respect to FIGS. 4A, 4B, 4C, and 4D, regarding each layered wood panel making up cured layered wood panel product stack 163A is collected.

In various embodiments, this quality parameter data represents results from analysis of specific quality parameters and specific quality parameter values, such as density and thickness as discussed above.

In one embodiment, the specific quality parameters and specific quality parameter values of the quality parameter data obtained from the quality control analysis at panel trim, quality analysis and shipping area 111 is correlated with control signal and production parameter data obtained from control system 202 of robot panel assembly cell 201A. In one embodiment, the quality parameter data and control signal and production parameter data are forwarded to quality analysis and feedback cell 301 for analyzing the quality of cured layered wood product panels. Based on this analysis, the control signals sent from control system 202 of robot panel assembly cell 201A to the one or more veneer handling robots, the one or more core handling robots, and the one or more glue application robots is adjusted in order to improve the quality of subsequent cured layered wood product panels.

In one embodiment, the quality analysis and feedback cell 301 includes an artificial intelligence module (not shown). In one embodiment, the quality analysis and feedback cell 301 obtains the quality parameter data from the quality analysis of multiple cured layered wood product panels and correlates the quality parameter data associated with each cured layered wood product panel and the control signal and production parameter data associated with the control signals generated by control system 202 used to control the one or more veneer handling robots, the one or more glue application robots, and the one or more core handling robots used to produce the cured layered wood product panel.

In one embodiment, the correlated quality data and control signal and production parameter data is then used as training data to generate a trained artificial intelligence module. In one embodiment, the trained artificial intelligence module is then used adjust the control signals used to control the one or more veneer handling robots, the one or more glue application robots, and the one or more core handling robots automatically for subsequent green layered wood product panel stack production.

Embodiments of the present disclosure provide an effective and efficient technical solution to the long-standing technical problem of providing a method and system for producing layered wood products that is less expensive to operate and more efficient than prior art methods.

In one embodiment, local robotic panel assembly cells including: one or more veneer handling robots; one or more glue application robots; and, in some embodiments, one or more core handling robots, are used to independently produce stacks of layered wood product panels at or near the pressing stations. The local robotic panel assembly cells are used to assemble the stacks at independent static locations local to the pressing stations and as the stacks are required. Consequently, using the disclosed embodiments, the stacks of layered wood product panels are independently built locally at the pressing stations thereby eliminating the need for traditional panel conveyors, traditional layered wood product panel assembly layup lines, and stack press delivery lines. This, in turn, eliminates thousands of moving parts and dozens of people from the layered wood product production process.

The disclosed methods and systems include one or more independently operating local robotic panel assembly and pressing stations that include: a robot panel assembly cell, the robot panel assembly cell producing a stack of green layered wood product panels; a pre-press, the pre-press pressing the stack of green layered wood product panels to produce pre-pressed layered wood product panels; and a hot press, the hot press heating and pressing the pre-pressed layered wood product panels to produce cured layered wood product panels.

In one embodiment, the robot panel assembly cell includes: one or more veneer handling robots, the one or more veneer handling robots retrieving veneer sheets from a stack of veneer sheets and placing the veneer sheets on a green layered wood product panel stack in accordance with received control signals; one or more glue application robots, the one or more glue application robots applying a layer of glue between sheets of veneer in the green layered wood product panel stack in accordance with received control signals; and a control system for controlling the one or more veneer handling robots and the one or more glue application robots and directing the one or more veneer handling robots and the one or more glue application robots in the construction of the green layered wood product panel stack via control signals sent to the one or more veneer handling robots and the one or more glue application robots.

In one embodiment, the robot panel assembly cell includes: one or more veneer handling robots, the one or more veneer handling robots retrieving veneer sheets from a stack of veneer sheets and placing the veneer sheets on a green plywood panel stack in accordance with received control signals; one or more core handling robots, the one or more core handling robots retrieving core material from a core material stack and placing the core material on the green plywood panel stack in accordance with received control signals; one or more glue application robots, one or more glue application robots applying a layer of glue between sheets of veneer and core material in the green plywood panel stack in accordance with received control signals; and a control system for controlling the one or more veneer handling robots, the one or more core handling robots, and the one or more glue application robots and directing the one or more veneer handling robots, the one or more core handling robots, and the one or more glue application robots in the construction of the green plywood panel stack via control signals sent to the one or more veneer handling robots, the one or more core handling robots, and the one or more glue application robots.

In one embodiment, the robot panel assembly cell includes: one or more veneer handling robots, the one or more veneer handling robots retrieving veneer sheets from a stack of veneer sheets and placing the veneer sheets on a green PLV panel stack in accordance with received control signals; one or more glue application robots, the one or more glue application robots applying a layer of glue between sheets of veneer in the green PLV panel stack in accordance with received control signals; and a control system for controlling the one or more veneer handling robots and the one or more glue application robots and directing the one or more veneer handling robots and the one or more glue application robots in the construction of the green PLV panel stack via control signals sent to the one or more veneer handling robots and the one or more glue application robots.

Consequently, using the disclosed embodiments, many of the shortcomings of prior art are minimized or by-passed/resolved. For instance, using the methods and systems for producing layered wood products disclosed herein there is the no need for traditional panel conveyors, traditional layered wood product panel assembly layup lines, nor stack press delivery lines. Therefore, the large physical size, e.g., hundreds of feet, of factory floor space required by prior art methods and systems are not needed.

In addition, since using the methods and systems for producing layered wood products disclosed herein there is no need for traditional panel conveyors, traditional layered wood product panel assembly layup lines, nor stack press delivery lines, the thousands of moving parts and sensors required by prior art methods and systems are no longer required nor utilized. This makes the disclosed methods and systems for producing layered wood products much less maintenance intensive.

In addition, since using the methods and systems for producing layered wood products disclosed herein there is no need for traditional panel conveyors, traditional layered wood product panel assembly layup lines, nor stack press delivery lines, there is no need for the large number of electric motors and substantial power consumption required by prior art methods and systems. This makes the disclosed methods and systems for producing layered wood products less expensive to operate and a less of a drain on the environment.

In addition, since using the methods and systems for producing layered wood products disclosed herein there is no need for traditional panel conveyors, traditional layered wood product panel assembly layup lines, nor stack press delivery lines, the disclosed methods and systems are less manpower intensive for operation and maintenance. This makes the disclosed methods and systems for producing layered wood products not only less expensive to operate but also less subject to human error and potential injury.

In addition, unlike prior art methods and systems, any failure of any one of the substantially fewer moving parts required by the disclosed methods and systems for producing layered wood products, or any human error introduced, does not result in substantial product waste due to glue degradation, i.e., glue dry out. This is because using the methods and systems for producing layered wood products disclosed herein the stacks of layered wood product panels are independently built locally at the pressing stations so there is, at most, only one stack that may be lost if there is a failure in the associated pressing station. This means a loss of, at most, forty layered wood product panels, as compared to a potential loss of four hundred or more panels using prior art methods and systems.

In addition, unlike prior art methods and systems, using the methods and systems for producing layered wood products disclosed herein material and glue systems can be configured to run multiple products at a time, i.e., multiple ply count panel products and/or multiple types of product (plywood or PLV), at a time. This is because using the methods and systems for producing layered wood products disclosed herein the stacks of layered wood product panels are independently built at the pressing stations. Consequently, each pressing station has its own robot panel assembly cell and each robot panel assembly cell can be directed/controlled by control signals to independently assemble a different product.

In addition, unlike prior art methods and systems, using the methods and systems for producing layered wood products disclosed herein glue application robots are used to assemble each stack. These glue application robots apply the glue by moving back and forth over the structure, as opposed to having the structure move beneath the glue applicator. Consequently, glue spread rates can be very precisely controlled and it is relatively simple to make fine adjustments to the amount of glue applied to compensate for ambient temperature, line speed changes, etc.

In addition, unlike prior art methods and systems, using the methods and systems for producing layered wood products disclosed herein the robot panel assembly cells and control systems can be used to make a direct correlation between individual panel quality and the assembly process variables used for construction of that specific panel.

In addition, since using the methods and systems for producing layered wood products disclosed herein there is no need for traditional panel conveyors, traditional layered wood product panel assembly layup lines, nor stack press delivery lines, housekeeping, i.e., keeping the workplace clean and safe, is a much simpler since the assembly locations are static and of relatively small physical size. In addition, since using the methods and systems for producing layered wood products disclosed herein each robot panel assembly cell can operate a local robot panel assembly and pressing line completely independently of other local robot panel assembly and pressing lines, when keep up is required at one local robot panel assembly and pressing line only that local robot panel assembly and pressing line need to shut down while the other local robot panel assembly and pressing lines continue to operate.

In addition, in one embodiment, the disclosed method and system for producing layered wood products includes a veneer inspection/grading robot and an inspection/grading system which is used to determine the quality of veneer fed into process during feeding operation. Therefore, defects can be detected, and the veneer sheets can be graded before significant time and energy has already been devoted to the panels.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A local robotic panel assembly and pressing station, the local robotic panel assembly and pressing station comprising:
   a single robot panel assembly cell station, the single robot panel assembly cell station being located at a single stationary robot panel assembly cell station location, the single robot panel assembly cell station including at least one stack of veneer sheets, a control system, and two or more robots all located at the same single stationary robot panel assembly cell station location, the single robot panel assembly cell station producing a green layered wood product panel stack, the green layered wood product panel stack including two or more green layered wood product panels, at the single stationary robot panel assembly cell station location;
a pre-press, the pre-press receiving the green layered wood product panel stack, including two or more green layered wood product panels, from the single stationary robot panel assembly cell station location, the pre-press pressing the green layered wood product panel stack to produce pre-pressed layered wood product panels;
a hot press, the hot press heating and pressing the pre-pressed layered wood product panels to produce cured layered wood product panels; and
a quality analysis and feedback cell, the quality analysis and feedback cell for analyzing quality of cured layered wood product panels.

2. The local robotic panel assembly and pressing station of claim 1 wherein the single robot panel assembly cell station includes:
one or more veneer handling robots, the one or more veneer handling robots retrieving veneer sheets from the at least one stack of veneer sheets and placing the veneer sheets on the green layered wood product panel stack at the single stationary robot panel assembly cell station location in accordance with received control signals;
one or more glue application robots, the one or more glue application robots applying a layer of glue between sheets of veneer in the green layered wood product panel stack at the single stationary robot panel assembly cell station location in accordance with received control signals; and
the control system, wherein the control system controls the one or more veneer handling robots and the one or more glue application robots and directs the one or more veneer handling robots and the one or more glue application robots in the construction of the green layered wood product panel stack at the single stationary robot panel assembly cell station location via control signals sent to the one or more veneer handling robots and the one or more glue application robots.

3. The local robotic panel assembly and pressing station of claim 2 wherein the quality analysis and feedback cell analyzes the quality of cured layered wood product panels and adjusts the control signals sent to the one or more veneer handling robots and the one or more glue application robots in response to the quality analysis in order to improve the quality of subsequent cured layered wood product panels.

4. The local robotic panel assembly and pressing station of claim 3 wherein the quality analysis and feedback cell analyzes one or more quality parameters including wood panel density.

5. The local robotic panel assembly and pressing station of claim 3 wherein the quality analysis and feedback cell analyzes one or more quality parameters including wood panel thickness.

6. The local robotic panel assembly and pressing station of claim 3 wherein the quality analysis and feedback cell includes an artificial intelligence module, further wherein the quality analysis and feedback cell obtains quality parameter data from the quality analysis of multiple cured layered wood product panels and correlates the quality parameter data of each cured layered wood product panel with control signal data associated with the control signals used to produce that cured layered wood product panel, further wherein the correlated quality parameter data and control signal data is used as training data to generate a trained artificial intelligence module.

7. The local robotic panel assembly and pressing station of claim 6 wherein the trained artificial intelligence module adjusts the control signals automatically for subsequent green layered wood product panel stack production.

8. A local robotic panel assembly and pressing station, the local robotic panel assembly and pressing station comprising:
a single robot panel assembly cell station, the single robot panel assembly cell station being located at a single stationary robot panel assembly cell station location, the single robot panel assembly cell station including at least one stack of veneer sheets, a control system, and two or more robots all located at the same single stationary robot panel assembly cell station location, the single robot panel assembly cell station producing a green plywood panel stack, the green plywood panel stack including two or more green plywood panels, at the single stationary robot panel assembly cell station location;
a pre-press, the pre-press receiving the green plywood panel stack, including two or more green plywood panels, from the single stationary robot panel assembly cell station location, the pre-press pressing the green plywood panel stack to produce pre-pressed plywood panels;
a hot press, the hot press heating and pressing the pre-pressed plywood panels to produce cured plywood panels; and
a quality analysis and feedback cell, the quality analysis and feedback cell for analyzing quality of cured plywood panels.

9. The local robotic panel assembly and pressing station of claim 8 wherein the single robot panel assembly cell station includes:
one or more veneer handling robots, the one or more veneer handling robots retrieving veneer sheets from a stack of veneer sheets and placing the veneer sheets on the green plywood panel stack in accordance with received control signals;
one or more glue application robots, the one or more glue application robots applying a layer of glue between sheets of veneer in the green plywood panel stack in accordance with received control signals; and
the control system, wherein the control system controls the one or more veneer handling robots and the one or more glue application robots and directs the one or more veneer handling robots and the one or more glue application robots in the construction of the green plywood panel stack via control signals sent to the one or more veneer handling robots and the one or more glue application robots.

10. The local robotic panel assembly and pressing station of claim 9 wherein the quality analysis and feedback cell analyzes the quality of cured plywood panels and adjusts the control signals sent to the one or more veneer handling robots and the one or more glue application robots in response to the quality analysis in order to improve the quality of subsequent cured plywood panels.

11. The local robotic panel assembly and pressing station of claim 10 wherein the quality analysis and feedback cell analyzes one or more quality parameters including plywood panel density.

12. The local robotic panel assembly and pressing station of claim 10 wherein the quality analysis and feedback cell analyzes one or more quality parameters including plywood panel thickness.

13. The local robotic panel assembly and pressing station of claim 10 wherein the quality analysis and feedback cell includes an artificial intelligence module, further wherein the quality analysis and feedback cell obtains quality parameter data from the quality analysis of multiple cured plywood panels and correlates the quality parameter data of each cured plywood panel with control signal data associated with the control signals used to produce that cured plywood panel, further wherein the correlated quality parameter data and control signal data is used as training data to generate a trained artificial intelligence module.

14. The local robotic panel assembly and pressing station of claim 13 wherein the trained artificial intelligence module adjusts the control signals automatically for subsequent green plywood panel stack production.

15. A local robotic panel assembly and pressing station, the local robotic panel assembly and pressing station comprising:
   a single robot panel assembly cell station, the single robot panel assembly cell station being located at a single stationary robot panel assembly cell station location, the single robot panel assembly cell station including:
      one or more veneer handling robots, the one or more veneer handling robots retrieving veneer sheets from a stack of veneer sheets and placing the veneer sheets on a green plywood panel stack at the single stationary robot panel assembly cell station location in accordance with received control signals;
      one or more core handling robots, the one or more core handling robots retrieving core material from a core material stack and placing the core material on the green plywood panel stack at the single stationary robot panel assembly cell station location in accordance with received control signals;
      one or more glue application robots, the one or more glue application robots applying a layer of glue between sheets of veneer and core material in the green plywood panel stack at the single stationary robot panel assembly cell station location in accordance with received control signals;
      a control system, wherein the control system controls the one or more veneer handling robots, the one or more core handling robots, and the one or more glue application robots and directs the one or more veneer handling robots, the one or more core handling robots, and the one or more glue application robots in the construction of the green plywood panel stack at the single stationary robot panel assembly cell station location via control signals sent to the one or more veneer handling robots, the one or more core handling robots, and the one or more glue application robots;
   a pre-press, the pre-press receiving the green plywood panel stack, including two or more green plywood panels, from the single stationary robot panel assembly cell station location, the pre-press pressing the green plywood panel stack to produce pre-pressed plywood panels;
   a hot press, the hot press heating and pressing the pre-pressed plywood panels to produce cured plywood panels; and
   a quality analysis and feedback cell, the quality analysis and feedback cell for analyzing quality of cured plywood panels and adjusting the control signals sent to the one or more veneer handling robots, the one or more core handling robots, and the one or more glue application robots in response to the quality analysis in order to improve the quality of subsequent cured plywood panels.

16. The local robotic panel assembly and pressing station of claim 15 wherein the quality analysis and feedback cell analyzes one or more quality parameters including plywood panel density.

17. The local robotic panel assembly and pressing station of claim 15 wherein the quality analysis and feedback cell analyzes one or more quality parameters including plywood panel thickness.

18. The local robotic panel assembly and pressing station of claim 15 wherein the quality analysis and feedback cell includes an artificial intelligence module, further wherein the quality analysis and feedback cell obtains quality parameter data from the quality analysis of multiple cured plywood panels and correlates the quality parameter data of each cured plywood panel with control signal data associated with the control signals used to produce that cured plywood panel, further wherein the correlated quality parameter data and control signal data is used as training data to generate a trained artificial intelligence module.

19. The local robotic panel assembly and pressing station of claim 15 wherein trained artificial intelligence module adjusts the control signals automatically for subsequent green plywood panel stack production.

* * * * *